United States Patent [19]
Kujirai

[11] Patent Number: 6,026,185
[45] Date of Patent: *Feb. 15, 2000

[54] OUTLINE IMAGE GENERATION APPARATUS AND METHOD THAT GENERATES SPACE CORRECTION DATA

[75] Inventor: Yasuhiro Kujirai, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/719,277

[22] Filed: Sep. 24, 1996

[30] Foreign Application Priority Data

Sep. 28, 1995 [JP] Japan ................................ 7-251244

[51] Int. Cl.$^7$ ........................................................ G06K 9/48
[52] U.S. Cl. .......................... 382/199; 382/224; 382/254; 345/194; 345/468
[58] Field of Search ................................... 382/199, 200, 382/242, 203, 224, 185, 301, 190, 195, 181, 254, 186, 187, 258, 209; 345/467, 472, 443, 194, 127, 128, 144, 947; 395/110; 358/1.11

[56] References Cited

U.S. PATENT DOCUMENTS

| | | | |
|---|---|---|---|
| 5,295,240 | 3/1994 | Kajimoto | 345/472 |
| 5,304,988 | 4/1994 | Seto | 382/224 |
| 5,416,852 | 5/1995 | Kumamoto | 382/199 |
| 5,473,709 | 12/1995 | Aoki | 382/258 |
| 5,594,472 | 1/1997 | Date | 345/194 |
| 5,633,991 | 5/1997 | Hakaridani | 395/110 |
| 5,714,987 | 2/1998 | Otsuka | 345/467 |
| 5,801,712 | 9/1998 | Kujirai | 345/471 |

*Primary Examiner*—Leo H. Boudreau
*Assistant Examiner*—Ishrat Sherali
*Attorney, Agent, or Firm*—Fitzpatrick, Cella, Harper & Scinto

[57] ABSTRACT

Horizontal lines of a character are divided into groups of lines which are not offset from each other and distances between which are less than a predetermined value. Further, on conditions that two groups contain at least one common line and overlapping portion of lines of one group is offset from none of lines included in the other group, these two groups are combined. Consequently, space correction groups for the horizontal lines are formed. Then, by using areas of the horizontal lines included in the groups obtained as described above as space correction areas, spaces defined by points on outline of each line are corrected. As a result, it is possible to form a character of high quality by using data which does not include information on space correction.

21 Claims, 25 Drawing Sheets

| 403, 404 |
|---|
| NUMBER OF LINEWIDTH INFORMATION |
| COORDINATE (LO) OF 1ST LINE |
| COORDINATE (HI) OF 1ST LINE |
| COORDINATE (MIN) OF 1ST LINE |
| COORDINATE (MAX) OF 1ST LINE |
| COORDINATE (LO) OF 2ND LINE |
| COORDINATE (HI) OF 2ND LINE |
| COORDINATE (LO) OF m-TH LINE |
| COORDINATE (HI) OF m-TH LINE |
| COORDINATE (MIN) OF m-TH LINE |
| COORDINATE (MAX) OF m-TH LINE |

FIG. 10

| | 1 | 2 | 3 | 4 | 5 | 6 | 7 | 8 |
|---|---|---|---|---|---|---|---|---|
| SPACE CORRECTION GROUP NUMBER | 801 | 802 | 803 | 804 | 805 | 806 | 807 | 808 |
| REPRESENTATIVE LINE NUMBER | 1 | 1 | 1 | 1 | 1 | 1 | 1 | 1 |
| NUMBER OF LINEWIDTH INFORMATION INCLUDED IN EACH GROUP | 1 | 2 | 3 | 4 | 5 | 6 | 7 | 8 |
| 1ST LINEWIDTH INFORMATION NUMBER | 0 | 0 | 0 | 0 | 0 | 0 | 0 | 0 |
| 2ND LINEWIDTH INFORMATION NUMBER | 0 | 0 | 0 | 0 | 0 | 0 | 0 | 0 |
| 3RD LINEWIDTH INFORMATION NUMBER | 0 | 0 | 0 | 0 | 0 | 0 | 0 | 0 |
| 4TH LINEWIDTH INFORMATION NUMBER | 0 | 0 | 0 | 0 | 0 | 0 | 0 | 0 |
| 5TH LINEWIDTH INFORMATION NUMBER | 0 | 0 | 0 | 0 | 0 | 0 | 0 | 0 |
| 6TH LINEWIDTH INFORMATION NUMBER | 0 | 0 | 0 | 0 | 0 | 0 | 0 | 0 |
| 7TH LINEWIDTH INFORMATION NUMBER | 0 | 0 | 0 | 0 | 0 | 0 | 0 | 0 |
| 8TH LINEWIDTH INFORMATION NUMBER | 0 | 0 | 0 | 0 | 0 | 0 | 0 | 0 |
| PRIORITY ORDER | 0 | 0 | 0 | 0 | 0 | 0 | 0 | 0 |

OFFSET

NOT OFFSET

FIG. 12

| SPACE CORRECTION GROUP NUMBER | 1 | 2 | 3 | 4 | 5 | 6 | 7 | 8 |
|---|---|---|---|---|---|---|---|---|
| REPRESENTATIVE LINE NUMBER | 801 | 802 | 803 | 804 | 805 | 806 | 807 | 808 |
| NUMBER OF LINEWIDTH INFORMATION INCLUDED IN EACH GROUP | 3 | 3 | 3 | 3 | 2 | 2 | 1 | 1 |
| 1ST LINEWIDTH INFORMATION NUMBER | 1 | 2 | 3 | 4 | 5 | 6 | 7 | 8 |
| 2ND LINEWIDTH INFORMATION NUMBER | 2 | 3 | 5 | 6 | 7 | 8 | 0 | 0 |
| 3RD LINEWIDTH INFORMATION NUMBER | 3 | 5 | 7 | 8 | 0 | 0 | 0 | 0 |
| 4TH LINEWIDTH INFORMATION NUMBER | 0 | 0 | 0 | 0 | 0 | 0 | 0 | 0 |
| 5TH LINEWIDTH INFORMATION NUMBER | 0 | 0 | 0 | 0 | 0 | 0 | 0 | 0 |
| 6TH LINEWIDTH INFORMATION NUMBER | 0 | 0 | 0 | 0 | 0 | 0 | 0 | 0 |
| 7TH LINEWIDTH INFORMATION NUMBER | 0 | 0 | 0 | 0 | 0 | 0 | 0 | 0 |
| 8TH LINEWIDTH INFORMATION NUMBER | 0 | 0 | 0 | 0 | 0 | 0 | 0 | 0 |
| PRIORITY ORDER | | | | | | | | |

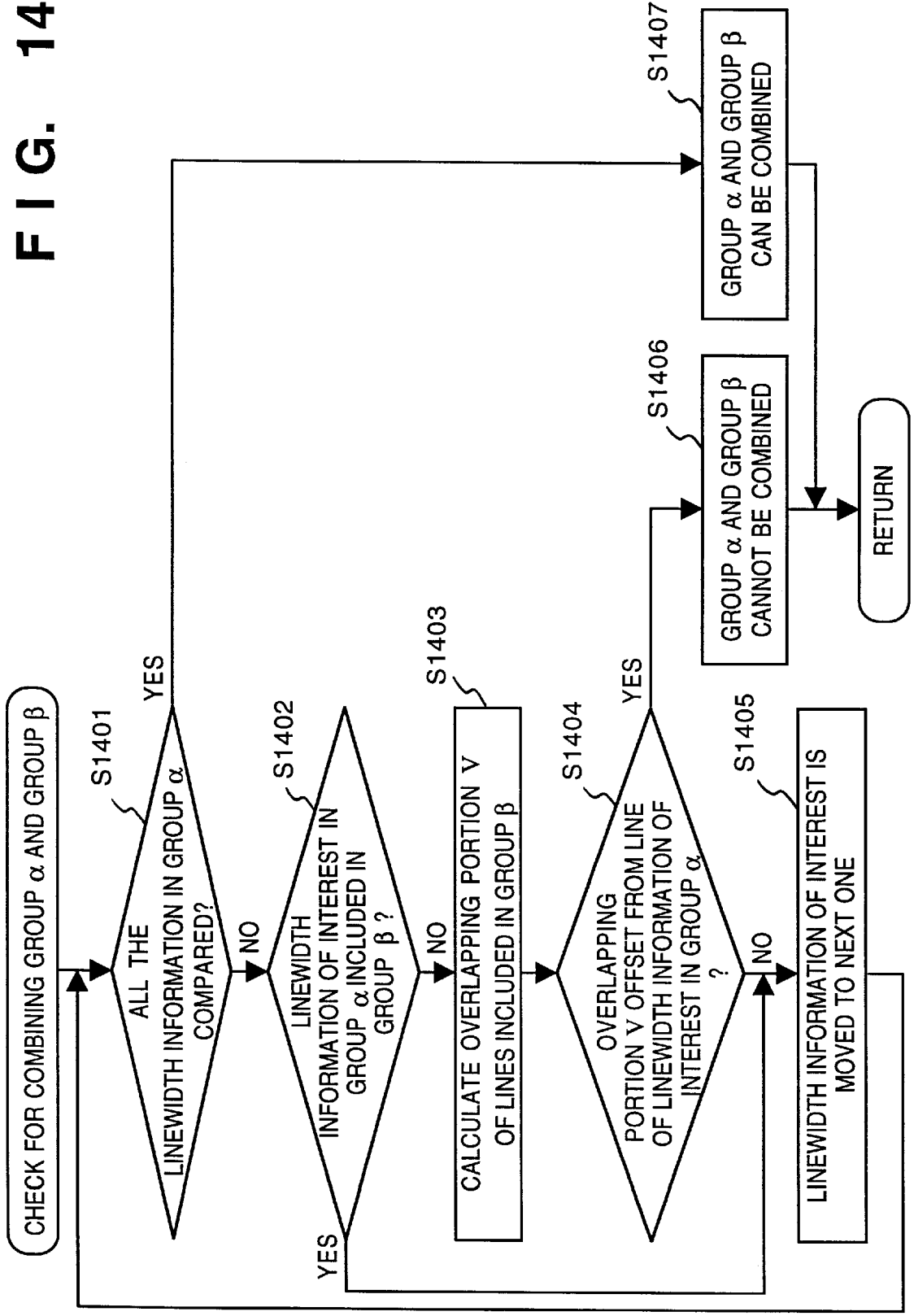

FIG. 18A

| SPACE CORRECTION GROUP NUMBER | 1 | 2 | 3 | 4 | 5 | 6 | 7 | 8 |
|---|---|---|---|---|---|---|---|---|
| REPRESENTATIVE LINE NUMBER | 801 | 802 | 803 | 804 | 805 | 806 | 807 | 808 |
| NUMBER OF LINEWIDTH INFORMATION INCLUDED IN EACH GROUP | 5 | 0 | 0 | 3 | 0 | 0 | 0 | 0 |
| 1ST LINEWIDTH INFORMATION NUMBER | 1 | 2 | 3 | 4 | 5 | 6 | 7 | 8 |
| 2ND LINEWIDTH INFORMATION NUMBER | 2 | 3 | 5 | 6 | 7 | 8 | 0 | 0 |
| 3RD LINEWIDTH INFORMATION NUMBER | 3 | 5 | 7 | 8 | 0 | 0 | 0 | 0 |
| 4TH LINEWIDTH INFORMATION NUMBER | 5 | 0 | 0 | 0 | 0 | 0 | 0 | 0 |
| 5TH LINEWIDTH INFORMATION NUMBER | 7 | 0 | 0 | 0 | 0 | 0 | 0 | 0 |
| 6TH LINEWIDTH INFORMATION NUMBER | 0 | 0 | 0 | 0 | 0 | 0 | 0 | 0 |
| 7TH LINEWIDTH INFORMATION NUMBER | 0 | 0 | 0 | 0 | 0 | 0 | 0 | 0 |
| 8TH LINEWIDTH INFORMATION NUMBER | 0 | 0 | 0 | 0 | 0 | 0 | 0 | 0 |
| PRIORITY ORDER | 1 | 0 | 0 | 2 | 0 | 0 | 0 | 0 |

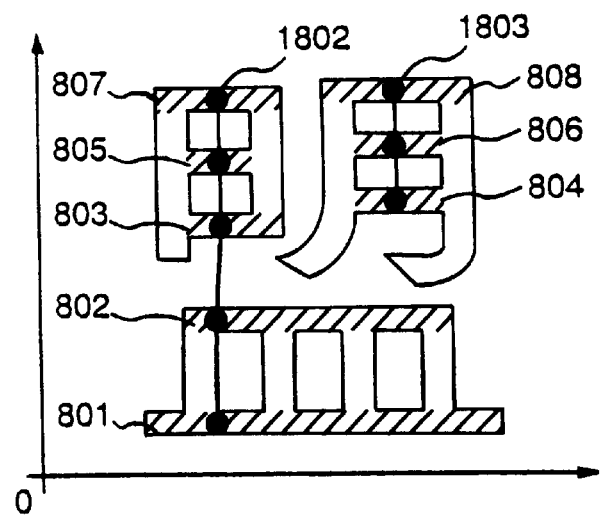

| | |
|---|---|
| NUMBER OF SPACE CORRECTION GROUPS IN THE HORIZONTAL DIRECTION hn | 1901 |
| NUMBER OF LINEWIDTH INFORMATION INCLUDED IN GROUP 1 hcnt(1) | ⎫ |
| NUMBER OF LINEWIDTH INFORMATION INCLUDED IN GROUP 2 hcnt(2) | ⎬ 1902 |
| ≈ | |
| NUMBER OF LINEWIDTH INFORMATION INCLUDED IN GROUP n hcnt(n) | ⎭ |
| LOWEST COORDINATE VALUE LO OF FIRST LINEWIDTH INFORMATION IN GROUP 1 | ⎫ |
| HIGHEST COORDINATE VALUE HI OF FIRST LINEWIDTH INFORMATION IN GROUP 1 | |
| ≈ | |
| LOWEST COORDINATE VALUE LO OF hcnt(1)-TH LINEWIDTH INFORMATION IN GROUP 1 | |
| HIGHEST COORDINATE VALUE HI OF hcnt(1)-TH LINEWIDTH INFORMATION IN GROUP 1 | |
| ≈ | ⎬ 1903 |
| LOWEST COORDINATE VALUE LO OF FIRST LINEWIDTH INFORMATION IN GROUP hn | |
| HIGHEST COORDINATE VALUE HI OF FIRST LINEWIDTH INFORMATION IN GROUP hn | |
| ≈ | |
| LOWEST COORDINATE VALUE LO OF hcnt(hn)-TH LINEWIDTH INFORMATION IN GROUP hn | |
| HIGHEST COORDINATE VALUE HI OF hcnt(hn)-TH LINEWIDTH INFORMATION IN GROUP hn | ⎭ |

FIG. 21

| COMMAND | USAGE | BRIEF FUNCTION |
|---|---|---|
| hlineto | dx hlineto | RENDER HORIZONTAL STRAIGHT LINE |
| hmoveto | dx hmoveto | MOVE IN THE HORIZONTAL DIRECTION |
| hvcurveto | dx1 dx2 dy2 dy3 hvcurveto | RENDER HORIZONTAL·VERTICAL CURVE |
| rlineto | dx dy rlineto | RENDER STRAIGHT LINE |
| rmoveto | dx dy rmoveto | MOVE |
| rrcurveto | dx1 dy1 dx2 dy2 dx3 dy3 rrcurveto | RENDER CURVE |
| vhcurveto | dy1 dx2 dy2 dx3 vhcurveto | RENDER VERTICAL:HORIZONTAL CURVE |
| vlineto | dy vlineto | RENDER VERTICAL LINE |
| vmoveto | dy vmoveto | MOVE IN THE VERTICAL DIRECTION |
| closepath | closepath | CLOSE OUTLINE |
| endglyph | endglyph | END RENDERING CHARACTER |
| xrpe | rpx ex xrpe | SET REFERENCE POINTS AND LINE FEED |

OUTLINE IMAGE GENERATION APPARATUS AND METHOD THAT GENERATES SPACE CORRECTION DATA

BACKGROUND OF THE INVENTION

The present invention relates to an apparatus using outline font in which the shape of a character is expressed by coordinates of the outline of the shape.

Upon developing a character bitmap on the basis of character data coded in outline form (outline font data), information on outline coordinate values (called "outline coordinate information", hereinafter) as well as information on linewidth correction (called "linewidth correction information", hereinafter) used for correcting linewidth of a character to be filled in color is also used so as to keep the shape of the character in good quality.

However, there is a problem in which the shape of the character cannot be generated in good quality by using only the linewidth correction information since it is not possible to prevent all the character strike to be unique, thereby there are cases where quality of the character is deteriorated.

For example, when the size of outline data of a character whose shape is shown in FIG. 29A is changed and the outline data is developed into a character bitmap, the shape of the character may become as shown in FIG. 29B. More specifically, the widths of lines may be maintained, however, the spaces between the lines may differ from those of the original character. When the character expressed as the bitmap shown in FIG. 29B is printed, the narrow spaces between lines will not be expressed and two lines will be printed as a thick single line.

In order to overcome the aforesaid problem, there is a method for correcting spaces between lines of a character. However, in a case where there are a plurality of spaces, between lines in a character, to be corrected, the quality of the character depends upon the distances between the lines. Accordingly, it is necessary to take the priority order of the spaces to be corrected into consideration.

SUMMARY OF THE INVENTION

The present invention has been made in consideration of the above situation, and has as its object to determine a space correction area or areas (groups of spaces, formed between lines of a character, to be corrected) on the basis of outline coordinates of a character and conventional linewidth correction information, and, if there are a plurality of space correction areas, determine the priority order of the space correction areas, thereby keeping the quality of the character high.

According to the present invention, the foregoing object is attained by providing an outline image generation apparatus for generating an image on the basis of outline data showing a figure and linewidth information of each line included in the figure, the apparatus comprising: correction area determination means for determining a correction area which includes a space to be corrected between line patterns of the figure on the basis of the linewidth information; correction means for correcting each space between line patterns in the correction area determined by the correction area determination means; and image generation means for generating an image of the figure on the basis of correction by the correction means and the outline data.

Further, according to the second configuration of the present invention, the foregoing object is also attained by providing an outline image generation method for generating an image on the basis of outline data showing a figure and linewidth information of each line included in the figure, the method comprising: a correction area determination step of determining a correction area which includes a space to be corrected between line patterns of the figure on the basis of the linewidth information; a correction step of correcting each space between line patterns in the correction area determined at the correction area determination step; and an image generation step of generating an image of the figure on the basis of correction at the correction step and the outline data.

Furthermore, according to the third configuration of the present invention, the foregoing object is also attained by providing a memory for storing a program for generating an image on the basis of outline data showing a figure and linewidth information of each line included in the figure, the memory comprising: a code module of a correction area determination step of determining a correction area which includes a space to be corrected between line patterns of the figure on the basis of the linewidth information; a code module of a correction step of correcting each space between line patterns in the correction area determined at the correction area determination step; and a code module of an image generation step of generating an image of the figure on the basis of correction at the correction step and the outline data.

Further, according to the fourth configuration of the present invention, the foregoing object is also attained by providing a program for generating an image on the basis of outline data showing a figure and linewidth information of each line included in the figure, the memory comprising: a code of a correction area determination step of determining a correction area which includes a space to be corrected between line patterns of the figure on the basis of the linewidth information; a code of a correction step of correcting each space between line patterns in the correction area determined at the correction area determination step; and a code of an image generation step of generating an image of the figure on the basis of correction at the correction step and the outline data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a table for explaining an arrangement showing space correction groups of the Chinese character "盟";

FIG. 12 is a table showing an output during determination of space correction groups in the Chinese character "盟";

FIG. 14 is a flowchart showing a flow of processes according to the first embodiment;

FIG. 18 is a table showing an output of determined space correction groups in the Chinese character "盟";

FIG. 19 is an explanatory view showing an output format according to the first embodiment;

FIG. 21 is a table explaining main commands of X4163 according to a second embodiment;

DETAILED DESCRIPTION OF THE PREFERRED EMBODIMENTS

Preferred embodiments of the present invention will be described in detail in accordance with the accompanying drawings.

<First Embodiment>

A character processing apparatus according to a first embodiment of the present invention will be described in detail with reference to drawings.

Figure 1:
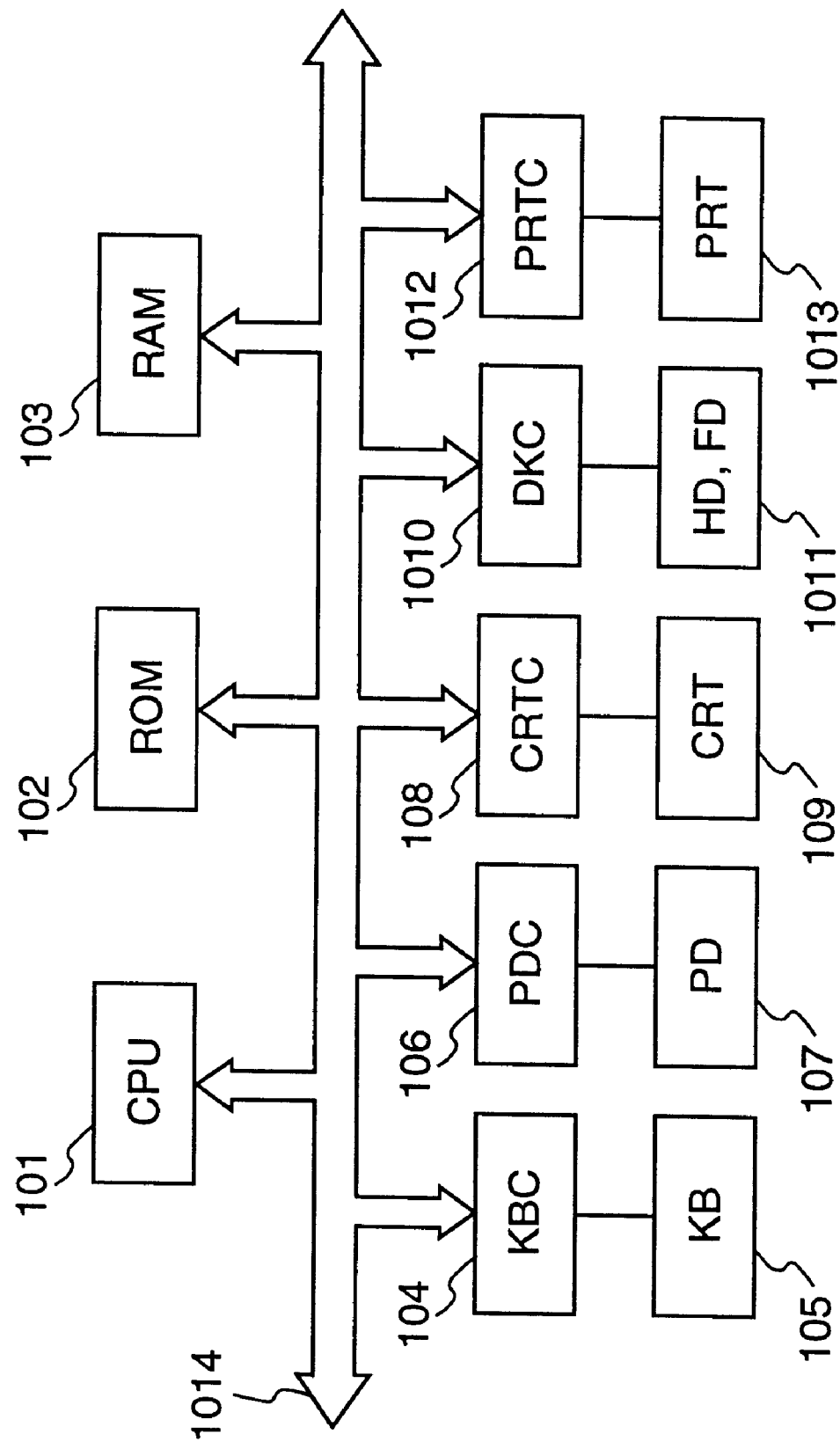
FIG. 1 is a block diagram illustrating a brief configuration of a character processing apparatus of all the embodiments of the present invention.

FIG. 1 is a block diagram illustrating a basic configuration of the apparatus according to the first embodiment of the present invention. The apparatus can be a font editor, a converter, a word processor, and an electronic typewriter, or can be a unit realizing the present invention by executing a computer program by a workstation or a computer system.

In FIG. 1, the central processing unit (CPU) 101 controls the entire operation of the character processing apparatus and performs calculations, for example. Further, the CPU 101 also controls development of a character pattern on the basis of character pattern data and correction data, which will be explained later.

A read-only memory (ROM) 102 is a storage space for storing a system start-up program, character pattern data, and so on.

A random access memory (RAM) 103 is a memory, serving as a data storage space whose use is not limited, to which various kinds of programs and data are loaded for executing a variety of processes.

A keyboard controller (KBC) 104 receives data inputted from a keyboard (KB) 105 and transmits the data to the CPU 101.

A pointing device controller (PDC) 106 receives coordinate data and other data inputted from a pointing device (PD) 107 and transmits the data to the CPU 101.

A display controller (CRTC) 108 outputs data to be displayed on a display unit 109. The display unit (CRT) 109 includes a display device, such as a CRT, and it receives data from the CRTC 108 and display it.

Reference numeral 1011 denotes an external storage unit, such as a floppy disk driver (FD) and a harddisk (HD), which stores programs and data. These programs and data are referred to or loaded to the RAM 103 when necessary during the character processing apparatus is operated.

A disk controller (DKC) 1010 controls transmission of data, and so on, between the character processing apparatus and the external storage unit 1011, such as the FD and HD.

A printer controller (PRTC) 1012 controls a printer (PRT) 1013.

The printer (PRT) 1013 receives data from the PRTC 1012 and executes printing on a recording medium.

A system bus 1014 is a data path among the aforesaid configuration elements.

Figure 2:
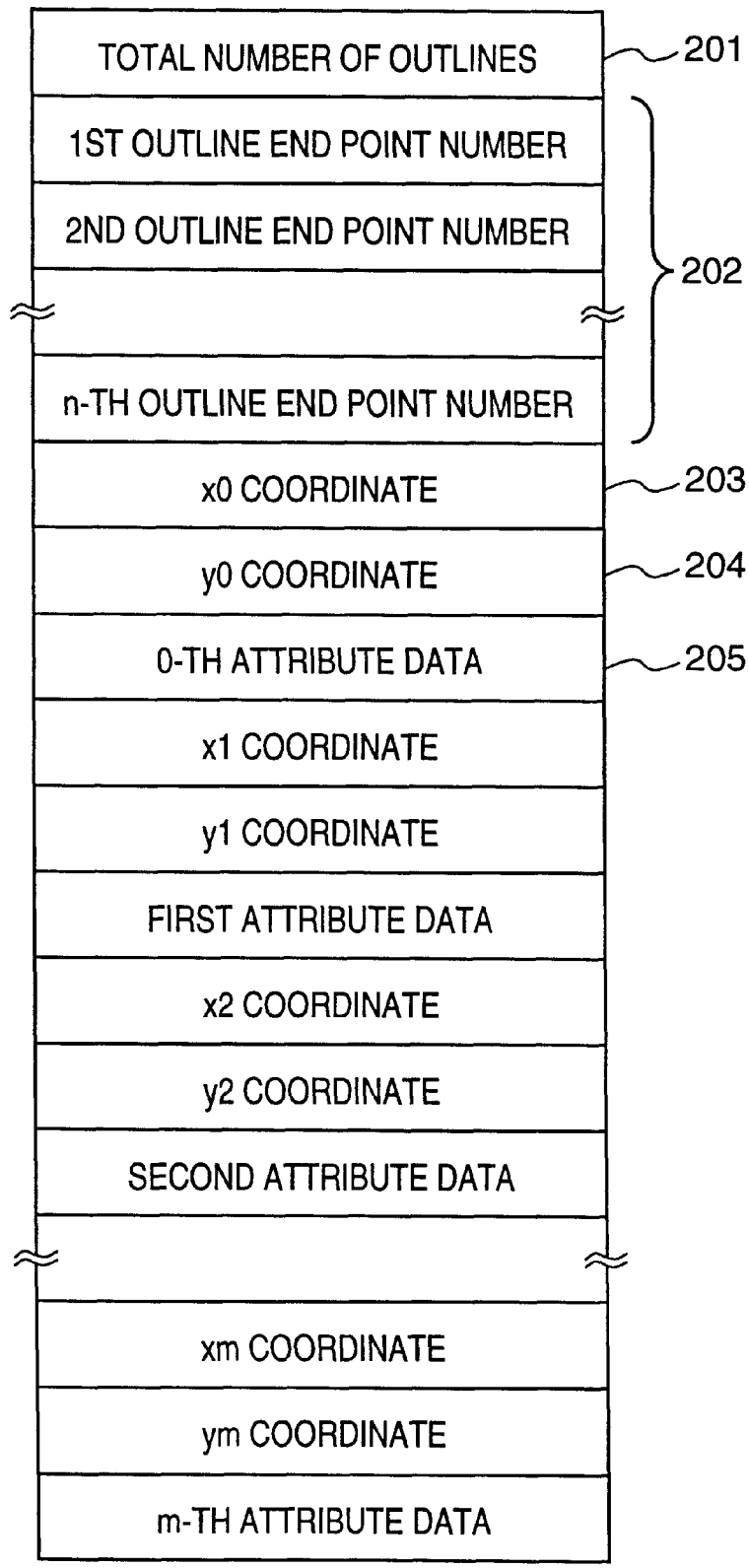
FIG. 2 is an explanatory view showing data structure of outline coordinate information according to a first embodiment.

Data structure of outline coordinate information used in the first embodiment is shown in FIG. 2.

Figure 3:
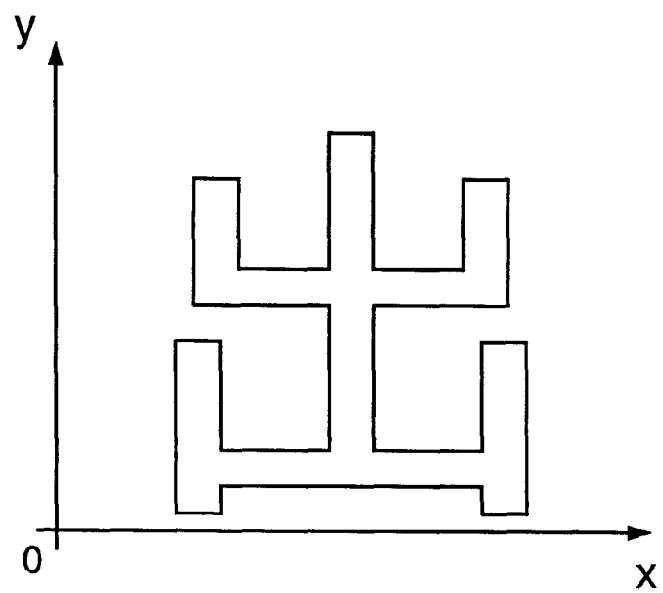
FIG. 3 is an explanatory view showing the left lowest coordinates in a two dimensional plane.

The outline coordinate information contains data of the total number of outlines 201, an end point number of each outline (called "outline end point number") 202, an x coordinate 203 and y coordinate 204 of each of control points which define an outline, and attribute data 205 showing whether the control point is the end point or a middle point on a Bezier cubic curve. In the first embodiment, outline coordinates are expressed in two dimensional plane coordinate system, as shown in FIG. 3, whose origin is at the left bottom corner.

Figure 4:
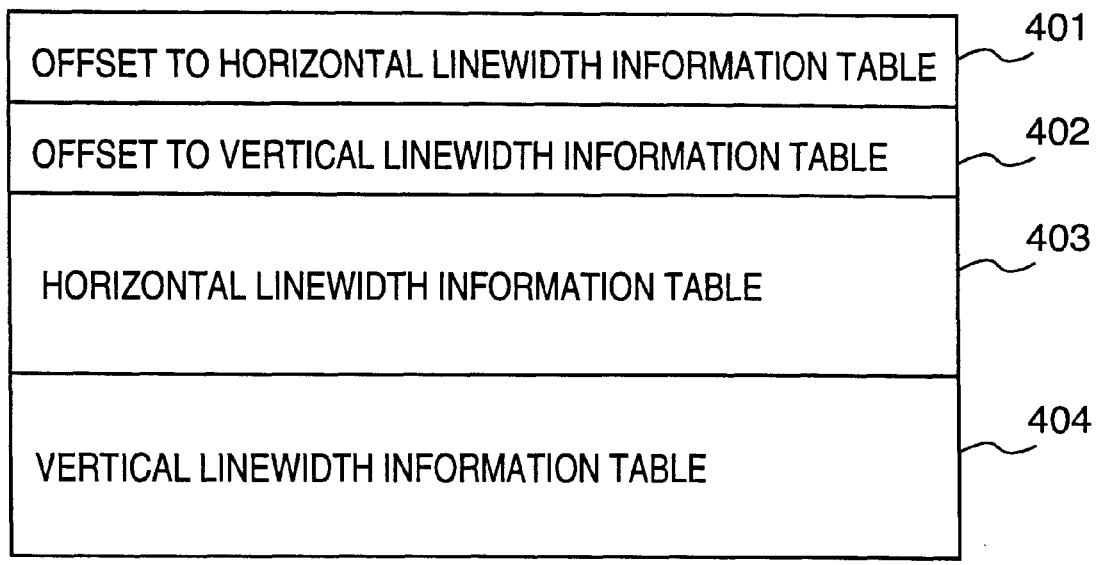
FIG. 4 is an explanatory view showing a coordinate system used in the first embodiment.

FIG. 4 is an explanatory view showing brief data structure of linewidth correction information. The linewidth correction information is referred as "linewidth information", hereinafter. In the first embodiment, the linewidth information is stored separately by kind. The separately stored linewidth information is called "linewidth information table", hereinafter.

In the first embodiment, two kinds of linewidth information tables, horizontal linewidth information, and vertical linewidth information are provided. At the top of the linewidth information, there is an offset 401 to a horizontal linewidth information table 403, and an offset 402 to a vertical linewidth information table 404 follows. The horizontal and vertical linewidth information tables designated by the corresponding offset values have the same data structure. Further, in a case where a character does not have a horizontal or vertical line, an offset to the corresponding horizontal or vertical linewidth information table is set to 0.

Figures 5, 6:
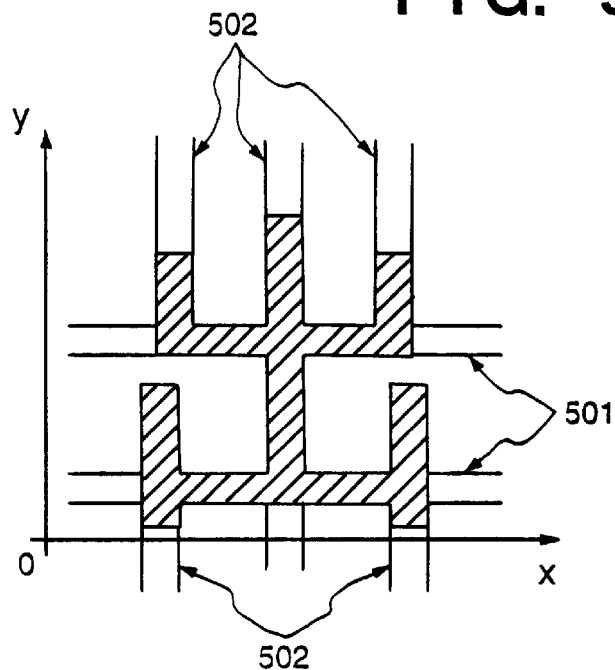
FIG. 5 is an explanatory view showing linewidth information according to the first embodiment.
FIG. 6 is an explanatory view showing data structure of a linewidth information table according to the first embodiment.

Examples of linewidths are shown in FIG. 5. Linewidths of horizontal lines are particularly called horizontal linewidths (501), and linewidths of vertical lines are called vertical linewidths (502).

FIG. 6 is an explanatory view showing data structure of horizontal and vertical linewidth information tables. Since the structure of these horizontal and vertical linewidth information tables are same, the structure shown in FIG. 6 applies to both of the tables. At the top of the horizontal linewidth information table 403, the number of horizontal linewidth information, HCOUNT, is stored. In comparison, at the top of the vertical linewidth information table 404, the number of vertical linewidth information, VCOUNT, is stored.

Figure 7:
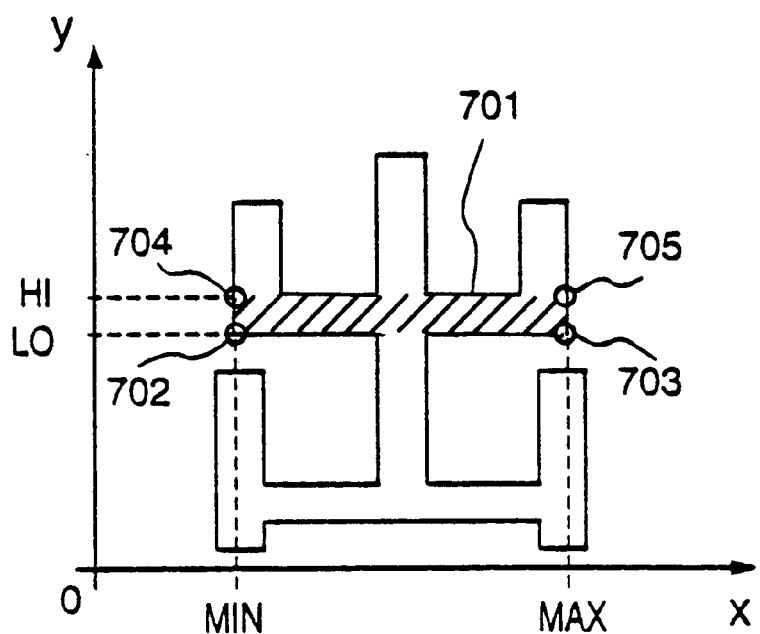
FIG. 7 is an explanatory view showing variables which are held as the linewidth information according to the first embodiment.

Further, each linewidth information table contains the same number of linewidth information as the number HCOUNT or VCOUNT. Each linewidth information includes the lowest coordinate value LO and the highest coordinate value HI in the y direction, the minimum coordinate value MIN and the maximum coordinate value MAX, in the x direction, of control points which represent the line. Each of the variables which compose linewidth information will be explained with reference to FIG. 7. Note, all reference numerals in FIG. 7 are based on a horizontal line 701 which is hatched with oblique lines. The minimum and maximum x coordinate values are expressed by MIN and MAX, respectively, and the lowest and highest y coordinate values are expressed by LO and HI, respectively, in the linewidth information of the horizontal line 701. Coordinates of the four corners, 702 to 705 of the line 701 can be expressed as (MIN, LO) for the point 702, (MAX, LO) for the point 703, (MIN, HI) for the point 704, and (MAX, HI) for the point 705.

<Character Image Generation Process>

Next, a sequence for generating a character image will be briefly explained.

Figure 24:
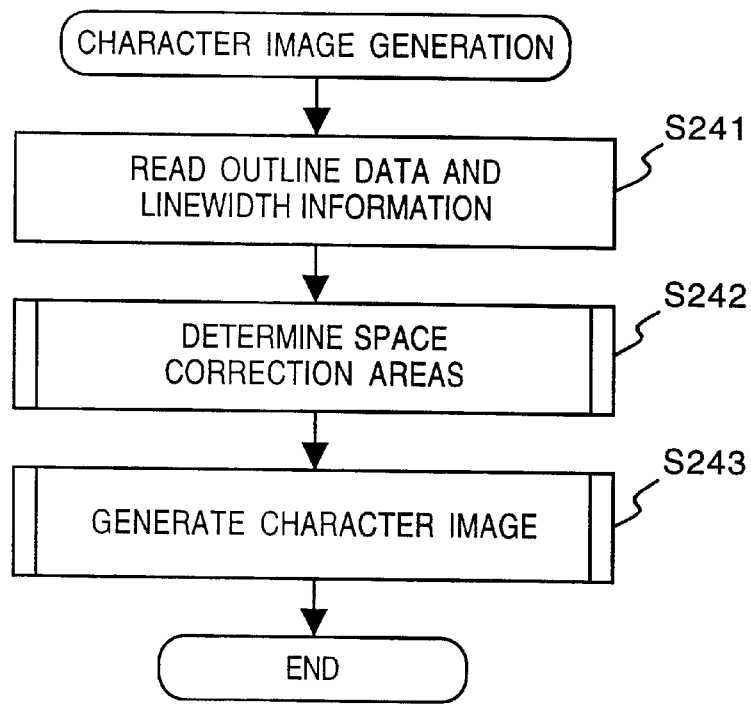
FIG. 24 is a flowchart showing a sequence of generating a character image.

In the apparatus of the first embodiment, a character image is generated from outline data in a sequence shown in FIG. 24. First, the outline data and linewidth information are read at step S241. Next at step S242, space correction areas are determined. This process will be explained later in detail. The outline data is enlarged or compressed, and corrected, then the character image is generated at step S243. This process corresponds to FIG. 26.

Next, an algorithm for determining space correction areas of a character according to the first embodiment will be explained. The word "space" in this embodiment denotes a portion sandwiched between lines running in the same direction, and it is defined that a space correction area is expressed by a group of linewidth information.

In the first embodiment, an effective area of linewidth information corresponding to outline coordinates is determined on the basis of the aforesaid outline coordinate information and the linewidth information, and outputted in a form of an array. Then, the outputted area is considered to be subject to space correction. Determination of a space correction area is performed in the following sequence, and the obtained area can be used in a module for scaling an outline font, in practice, (including a method of controlling by a CPU on the basis of a program for performing scaling, and a method of controlling by using a hardware exclusively provided for this use), such as a font scalar. In the font scalar, correction of a character to be generated is performed by using the space correction area.

<Determination of Space Correction Area>

Figure 8:
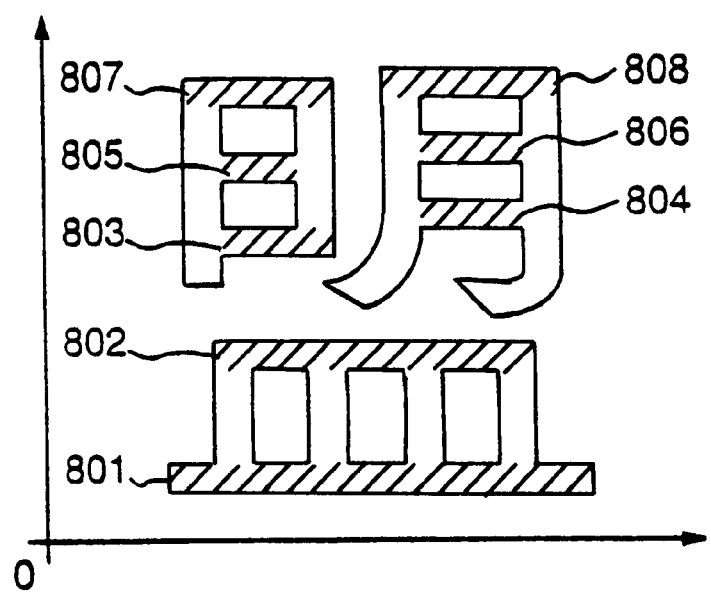
FIG. 8 is an explanatory view showing linewidth information of a Chinese character "盟"

A brief flow of processes according to the first embodiment is explained with reference to FIGS. 25, 9, 13, 14, 16 and 17. The algorithm is for determining a space correction area in the horizontal direction, however, a space correction area in the vertical direction is also determined by using the similar algorithm. As an example, determination of the space correction area in the horizontal direction of a Chinese character, "盟", shown in FIG. 8, is explained.

Figure 25:
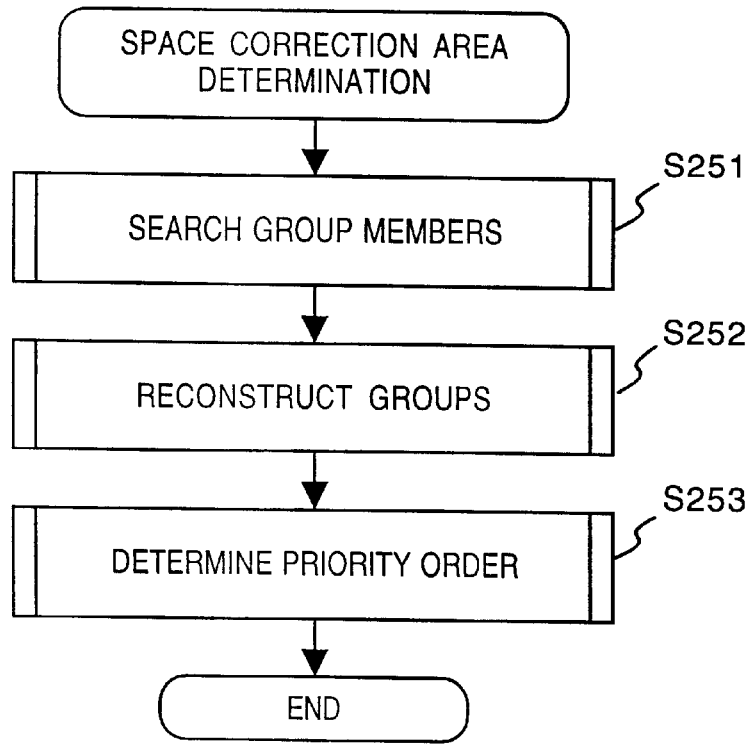
FIG. 25 is a flowchart showing a sequence of determining a space correction area.

Referring to FIG. 25, members (lines) which may form space correction areas are searched to make groups which are the base for determining the space correction areas. The conditions to be a member of a group are as follow. First, a line has to be within a predetermined distance from a reference line (representative line) of a group, and second, the line is not offset from any lines which have been registered as members of the group. These conditions are called space correction conditions. Note, the formed group is called a space correction group, and the linewidth information number of a representative line of a group is the group number. This sequence will be explained later with reference to FIG. 9. Next, the groups are united, and reconstructed. This operation will be explained later with reference to FIG. 13. Finally, obtained space correction areas are put in order in accordance with priority. This operation will be described later in detail with reference to FIG. 17.

Next, each step shown in FIG. 25 will be explained.

Figure 9:
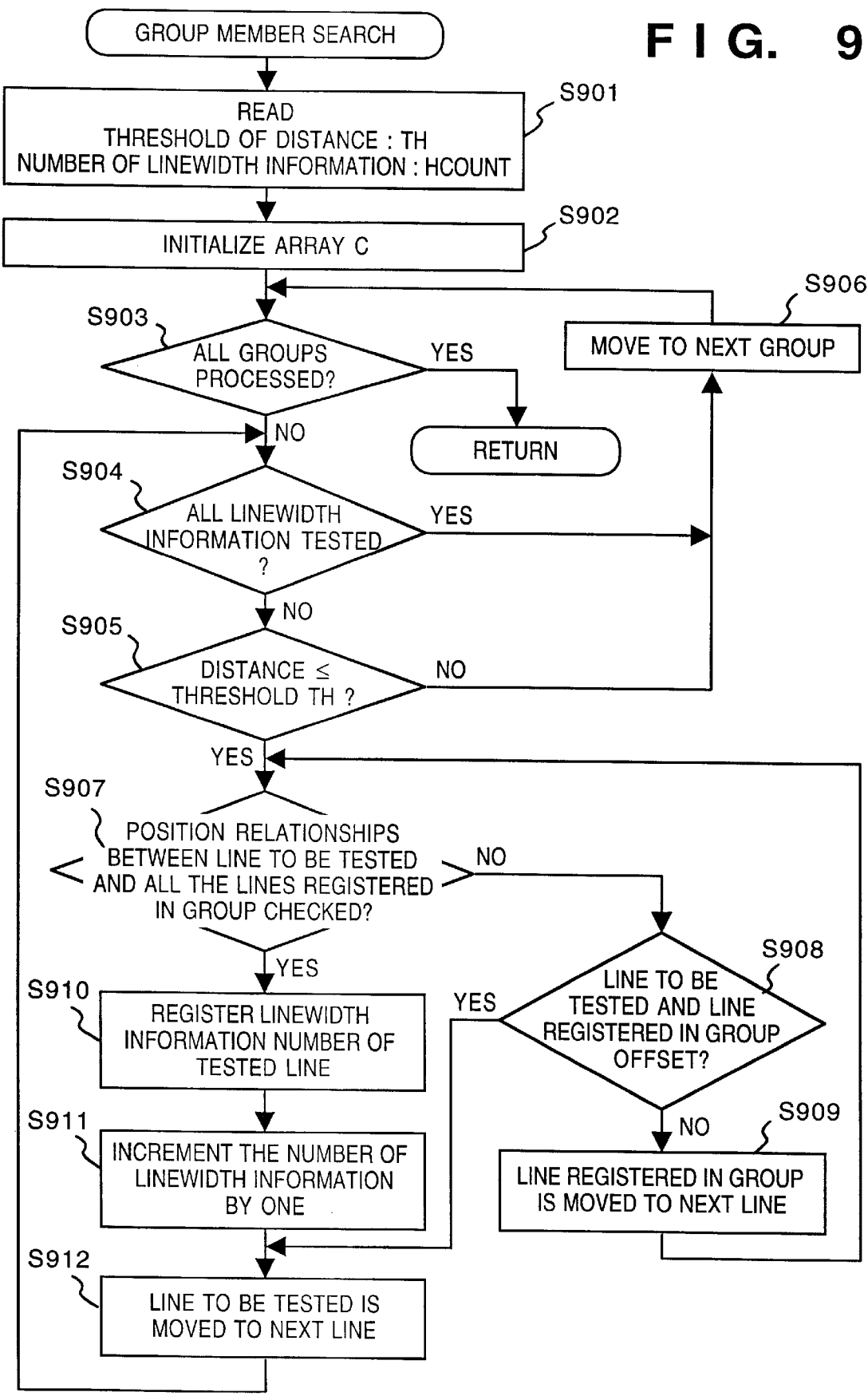
FIG. 9 is a flowchart showing a flow of processes according to the first embodiment.

Referring to FIG. 9, first, for each linewidth information, other linewidth information which belongs to a space correction group including the former linewidth information is searched at the first stage.

At step S901, a threshold of distance, TH, and the number of horizontal lines in a character which is subject to the processes, i.e., the number of linewidth information, HCOUNT, are read. In the character "盟", HCOUNT is 8. Horizontal lines of the character "盟" are referred by reference numerals 801 to 808 as shown in FIG. 8. The linewidth information on these lines is labeled in an ascending order of coordinate values, and numbered from 1 in accordance with the order (called "linewidth information number", hereinafter). For example, the linewidth information number of the line 801 is 1, and the linewidth information number of the line 808 is 8. Further, the threshold TH is determined depending upon resolution, or the like, of an apparatus for reproducing characters, or coordinates included in outline data of the characters.

At step S902, an array C which is used for determining space correction areas is initialized. An example of the array C is shown in FIG. 10. First, on the basis of the number of linewidth information HCOUNT read at step S901, the array C is defined to have cells of HCOUNT×(HCOUNT+2). This means that there are HCOUNT number of space correction groups each of which includes each linewidth information assumed to satisfy space correction conditions.

At initial setting of the array C, each linewidth information corresponds one-to-one to each space correction group. Then, (HCOUNT+2) elements are defined for each space correction group. The first element 1001 of each space correction group is defined to hold the number of linewidth information satisfying the space correction conditions to belong to the group, and 1 is inputted as the initial value. Note, when the number of linewidth information of a group holds 0, it is defined that the group is invalid. Furthermore, the linewidth information numbers of the linewidth information satisfying the space correction conditions are put in the second element through the (HCOUNT+1)-th element 1003. As for the initial linewidth information numbers to be put in each element, the linewidth information numbers of the representative lines of respective space correction groups are put in the corresponding first linewidth information numbers 1002, and 0 are put in the other elements. The last elements 1004 store the priority order, and are initialized to 0. At this point, the array C (inside of the bold line in FIG. 10) is initialized as shown in FIG. 10 for the character "盟".

Upon initializing the array C, all the elements may be set to 0, however, since space correction conditions are checked between the representative line and each horizontal line and it is defined that a comparison between the representative line and itself (e.g., between the linewidth information of the line 801 and the linewidth information of the line 801) always satisfies the space correction conditions, it is possible to reduce the number of comparison processes by setting the first linewidth information number of each group in the array C to the linewidth information number of the corresponding representative line. Referring to FIG. 10, the linewidth information number 1 (i.e., the linewidth information number of the line 801) is registered in the cell for the first linewidth information number of the group 1 as the first linewidth information satisfying the space correction conditions. Further, the number of the registered linewidth information, namely 1, is registered as the number of linewidth information 1001 of the space correction group 1. Similarly, the first linewidth information numbers of space correction groups 2 to 8 are set to the corresponding linewidth information numbers 2 to 8. As described above, the linewidth information number of the representative line of each space correction group is registered in the array C, first, as the line which belongs to each space correction group.

In the subsequent steps of step S903, whether other linewidth information satisfy the space correction conditions to belong to a space correction group is determined. If there is linewidth information satisfying the space correction conditions, corresponding linewidth information number or numbers are outputted to the array C. Here, the linewidth information of a line to be tested whether it satisfies the space correction conditions is referred by "H", and the linewidth information of line or lines which have already been registered in a group is referred by "GH". Initially, each linewidth information corresponds one-to-one to each space correction group. More descriptively, each group contains only the linewidth information of its representative line. The loop subsequent to step S902 begins with the space correction group 1 whose representative line is of the linewidth information number 1. Thereafter, space correction groups 2 to 7 are processed subsequently, then the process is ended at the space correction group 8 whose representative line is of the linewidth information number 8, at step S906, in the example shown in FIG. 10. As for linewidth information to be tested, linewidth information labeled by the linewidth information number or numbers which are larger than the linewidth information number of the representative line of each space correction group are tested. Therefore, the linewidth information of the linewidth information number 2 is the first linewidth information to be tested in this case. Similarly, when the group to be investigated is proceeded to the next group, comparison performed for determining whether the space correction conditions are satisfied or not starts from the linewidth information labeled by the linewidth information number which is next to the linewidth information number of the representative line of the group.

At step S903, whether the comparison has been performed on all the space correction groups or not is determined, and if it has, the processing is completed. Whereas, it has not, the process proceeds to step S904. In the example shown in FIG. 10, since there is no linewidth information to be compared to the representative line in the space correction group 8, the last group to be tested is the space correction group 7. The linewidth information to be compared to the representative line of the group 7 is of the linewidth information number 8 only. Therefore, if this comparison is finished, it is considered that the condition for completion of this processing is considered to be satisfied.

At step S904, whether all the linewidth information H has been tested to be a member of a group under investigation or not is determined, and if it has, the. process goes to step S906, whereas if it has not, the process proceeds to step S905. In the example shown in FIG. 10, the first registered linewidth information GH in the space correction group 1 is of the first linewidth information number 1, and the linewidth information H to be tested is of the linewidth information numbers 2 to 8. Likewise, the last linewidth information to be tested is always of the linewidth information number 8 for every space correction group, and when the comparison to the linewidth information of the linewidth information number 8 is finished, the condition for completion at step S904 is considered to be satisfied.

At step S905, the distance between the linewidth information H to be tested and the representative line of the group under investigation is calculated. Then, if the distance is less or equal to the threshold TH, the process moves to step S907, whereas if it is greater than the threshold TH, then the process proceeds to step S906 as it is considered that the distance or distances between the representative line and the remaining subsequent line or lines of the linewidth information H which has not been tested exceed the threshold TH. The distance between the representative line and a line of the linewidth information H can be defined by the distance between the lowest coordinate values LO, in the y direction, of the two lines to be compared, for example. In a case shown in FIG. 8, the distance between the line whose linewidth information is included in the group 1, namely the line 801 and the line 802 to be tested is compared to the threshold TH. Note, regarding horizontal lines, the highest or the lowest coordinate values in the vertical direction of two lines are used for obtaining the distance between the two lines, and regarding vertical lines, the maximum or the minimum coordinate values in the horizontal direction of the two lines are used for obtaining the distance between the two lines.

At step S906, the space correction group to be investigated is moved to the next group.

At step S907, whether position relationships between all the lines included in the group under investigation and a line to be tested (linewidth information H) have been checked or not is determined. If they have, it is determined that the linewidth information H satisfies space correction conditions to belong to the space correction group, and the process moves to step S910. Whereas, if they have not, the process proceeds to step S908.

Figure 11A:
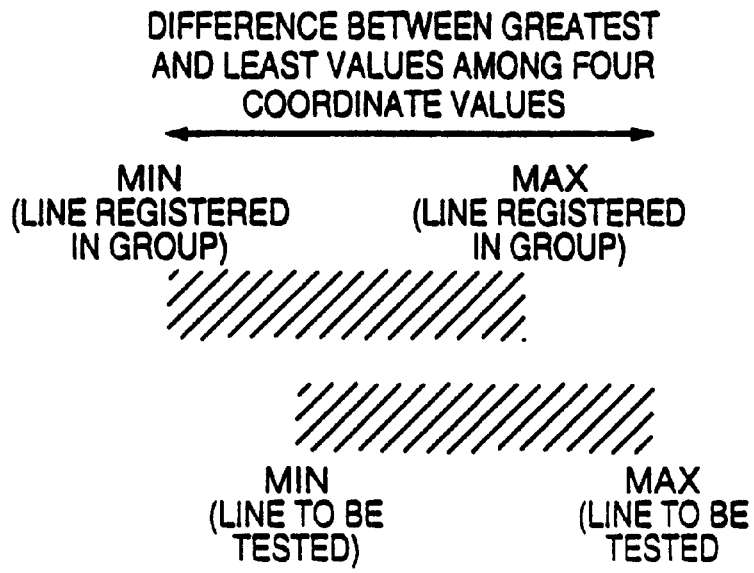
FIGS. 11A and 11B are explanatory views showing offset of linewidth information.
Figure 11B:
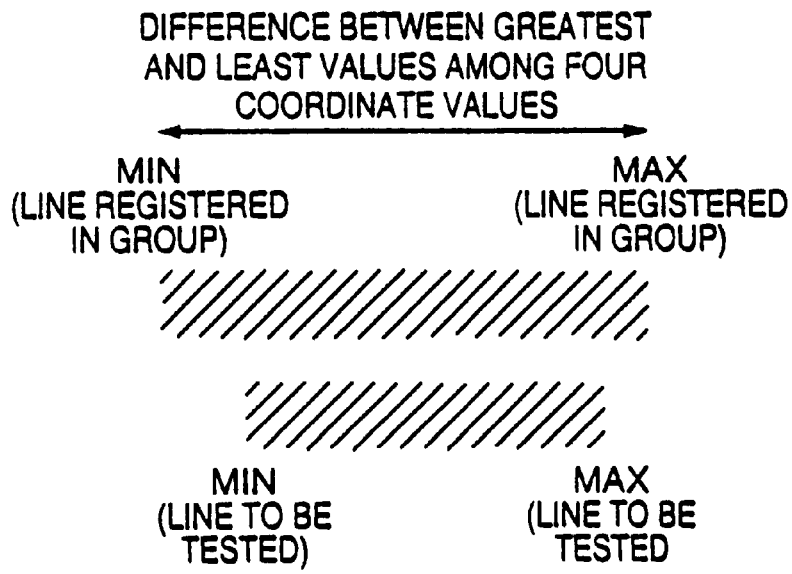

At step S908, position relationship between the line of linewidth information H and each line included in the group under investigation is checked. If these lines are offset from the each other, it is determined that the linewidth information H does not belong to this space correction group, and the process proceeds to step S912, where the line to be tested is moved to the next line. In contrast, if the two lines are not offset, the process proceeds to step S909. Whether the two lines are offset from each other or not is determined as follow. Among four coordinate values of the minimum and maximum values of the two lines, i.e., the minimum coordinate value MIN and the maximum coordinate value MAX of a line which belongs to a group and the minimum coordinate value MIN and the maximum coordinate value MAX of a line to be tested, the difference between the greatest value and the least value is calculated. Then, it is determined whether the difference is greater than either of the lengths of the two lines or not. If it is, it is determined that the two lines are offset as shown in FIG. 11A, whereas if it is not, it is determined that the two lines are not offset, as shown in FIG. 11B. In the example shown in FIG. 8, the line of the linewidth information number 3, i.e., the line 803, is offset with respect to the line 804, thus it is known that these two lines do not belong to the same space correction group.

At step S909, in order to determine whether the line of the linewidth information H is offset from the other lines which belong to the group under investigation or not, the line compared in the current loop is moved to the other line in the same group. The steps S907, S908 and S909 are repeated, and the tested line which is at an offset position is not registered to the space correction group under investigation.

At step S910, it is determined that the tested linewidth information H satisfies the space correction conditions to belong to the group under investigation, and the linewidth information number of the linewidth information H is outputted as an element, shown in the table in FIG. 10, of the group. As seen from the above operation, the space correction conditions are that the distance between a tested line and a representative line of a space correction group is less or equal to a threshold and the tested line does not offset from the line or lines which belong to the group. The tested line which satisfies these conditions is registered in an array as linewidth information belonging to the space correction group under investigation.

At step S911, the number of the linewidth information which belong to the group is incremented by 1.

At step S912, the line to be tested is moved to the next line.

With the processes as described above, the HCOUNT number of space correction groups are determined. In a case of the Chinese character "盟", the space correction groups are outputted in the array C as shown in FIG. 12. Referring to FIG. 12, the group 1 which includes the line labeled by the linewidth information number 1 as the representative line in the initial condition has three linewidth information of the linewidth information number 1, 2 and 3. This shows that the distances between the representative line (line 801) and the horizontal lines 801, 802 and 803, shown in FIG. 8, are within a predetermined threshold TH and these lines are not offset from each other.

Next, as a second stage, processes to reconstruct the space correction groups outputted to the array C showing the HCOUNT number of space correction groups as shown in FIG. 12 will be explained with reference to a flowchart in FIG. 13.

At step S1301, a group to be referred and a group to be tested (is set out of the space correction groups. To make the explanation easier to understand, the space correction group to be referred is called "group $\alpha$", and the space correction group to be tested is called "group $\beta$". The group $\beta$ includes lines of linewidth information numbers larger than linewidth information numbers in the group $\alpha$.

At step S1302, whether all the space correction groups have been compared or not is determined, and if they have, the process is ended, whereas it they have not, the process proceeds to step S1303.

At step S1303, whether any of linewidth information numbers of the group $\alpha$ is also included in the group $\beta$ is determined. If it is, the process proceeds to step S1304, whereas if it is not, it is determined that these two space correction groups exist independently, and the process moves to step S1307. For example, referring to FIG. 12, it is assumed that the space correction group 1 is set as the group $\alpha$ and the space correction group 2 is set as the group $\beta$. In this case, the linewidth information numbers 2 and 3 included in the group $\alpha$ are also included in the group $\beta$. Accordingly, the determination at step S1303 results in "Yes", and it is checked at step S1304 whether these two groups can be combined or not.

At step S1304, whether the two space correction group can be combined into one or not is checked, and the check result is discriminated at step S1305. If it is possible, the process proceeds to step S1306, whereas if it is not, the process moves to step S1307. The detailed process at step S1304 will be described later with reference to a flowchart in FIG. 14.

At step S1306, the group $\alpha$ and the group $\beta$ are combined into one. The way to combine the two groups is described in detail with reference to a flowchart shown in FIG. 16.

Figure 13:
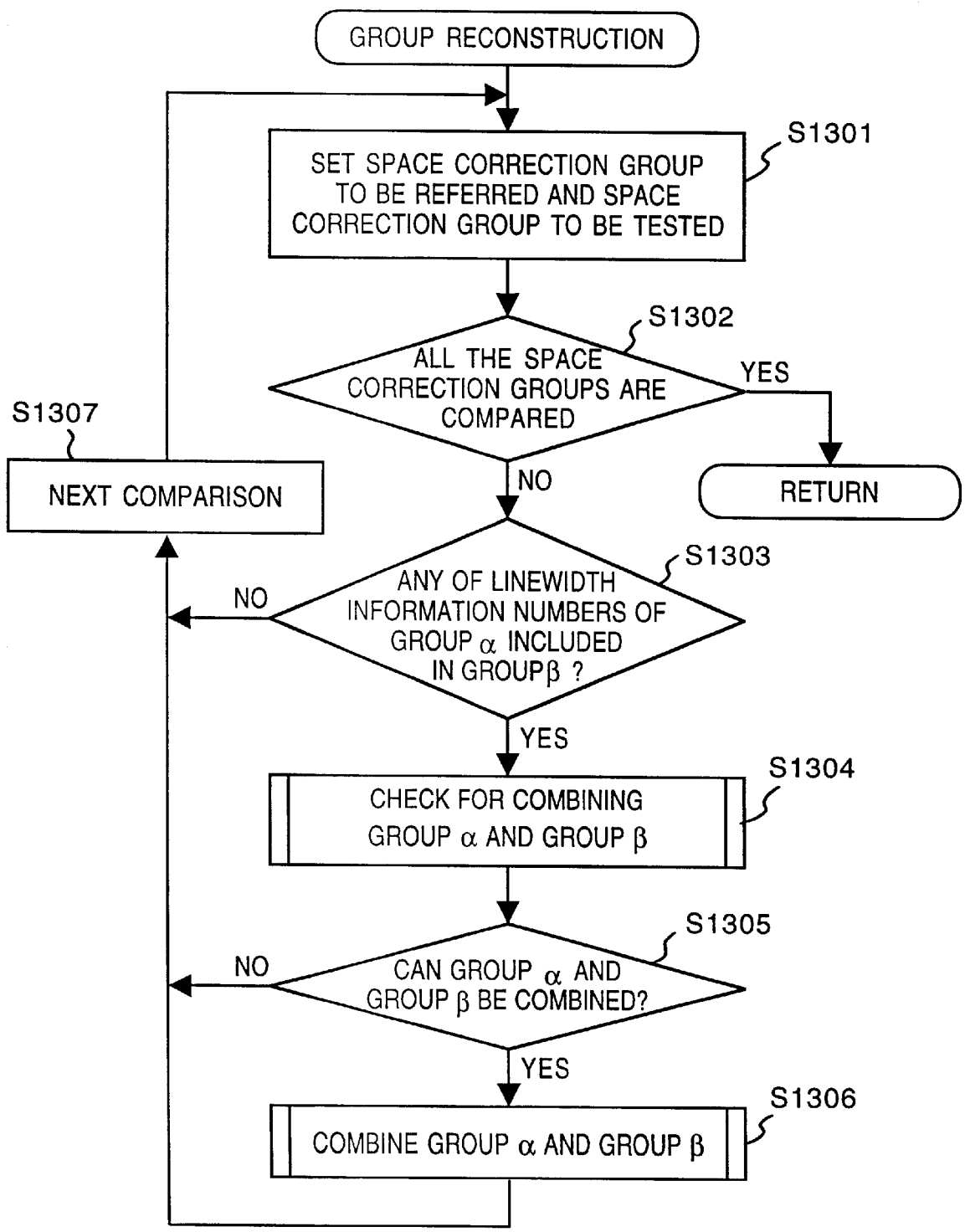
FIG. 13 is a flowchart showing a flow of processes according to the first embodiment.

The flowchart shown in FIG. 14 is for explaining the process at step S1304 of the flowchart in FIG. 13. In this process, it is examined whether or not an overlapping portion (referred by "V") of all the linewidth information included in the group $\beta$ is offset from any of the linewidth information included in a group $\alpha$. If the overlapping portion is offset from none of the linewidth information included in the group $\alpha$, then it is determined that the group $\alpha$ and the group $\beta$ can be combined.

At step S1401, whether all the comparison for determining that it is possible to combine the two space correction groups into one has been finished or not is determined. If it has, the process moves to step S1407 where the determination result indicating that the group $\alpha$ and the group $\beta$ can be combined is stored in a form of flag, for example. Whereas, it is has not, the process proceeds to step S1402.

At step S1402, whether the linewidth information, currently under interest, in the group $\alpha$ is included in the group $\beta$ or not is determined. If it is, the linewidth information in the group $\alpha$ is the effective linewidth information in the group $\beta$, and the process goes to step S1405. Whereas, if it is not, the process proceeds to step S1403. As for the order of linewidth information to be compared in the group $\alpha$, they may be selected in the order of registration in the array C. For example, let the space correction group 1 shown in FIG. 12 be the group $\alpha$ and the space correction group 2 in FIG. 12 be the group $\beta$. Then, if the linewidth information of interest in the group $\alpha$ is of the linewidth information number 2 or 3, this information is commonly included in both the groups $\alpha$ and $\beta$. Accordingly, the process moves from the step S1402 to S1405. However, if the linewidth information of interest in the group $\alpha$ is of the linewidth information number 1, since it is not included in the group $\beta$, the process proceeds to step S1403 in this case.

At step S1403, the range of the overlapping portion V of lines which belongs to the group β is calculated.

Figure 15A:
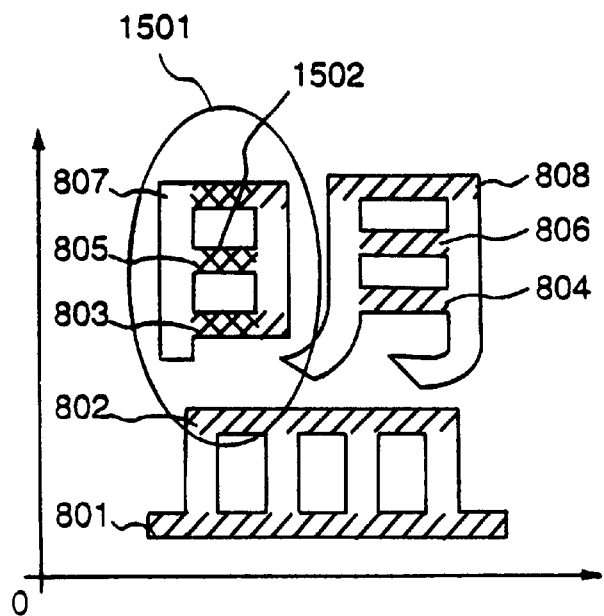
FIGS. 15A and 15B are explanatory view showing overlapping portions of linewidth information in a space correction group.
Figure 15B:
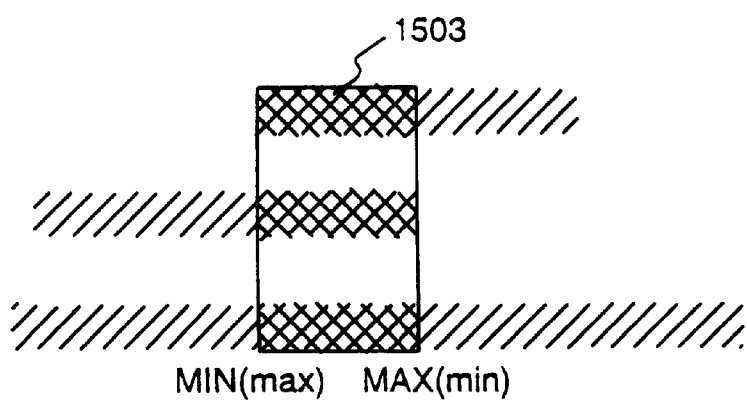

Referring to FIG. 15A, the range 1501, encircled by a solid line, is a space correction group whose representative line is of the line 803 in the Chinese character "盟". It is the space correction group 3 in FIG. 12. Paying close attention to the lines 803, 805 and 807 included in the group 3, portions 1502, hatched by net, are the parts where all the three lines are overlapping. This portion is the overlapping portion V obtained at step S1403. This overlapping portion V is defined by the greatest value among the minimum values MIN in the x direction and the least value among the maximum values MAX in the x direction, as shown in FIG. 7, in the linewidth information included in a space correction group, and a pattern of overlap may be as shown by the lines 1503 in FIG. 15B.

At step S1404, position relationship between the overlapping portion V of linewidth information included in the group β and a line of interest included in the group α is examined. If they are offset, the process goes to step S1406, whereas if they are not offset, the process proceeds to step S1405. The determination of offset is performed in the same manner as described at step S906 in FIG. 9. In other words, it is tested whether or not every line included in the group β is not offset from any line included in the group α.

At step S1405, linewidth information to be compared is moved to the next one in the group α.

At step S1406, it is determined that the two space correction groups α and β cannot be combined into one, and the process is over. More specifically, if there is a line, in the group α, which is offset from at least one line in the group β, it is set so that the group α and the group β are not combined into one.

At step S1407, the process is completed by determining that the two space correction groups α and β can be combined into one.

As described above, whether groups can be combined or not is determined. Referring to FIGS. 8 and 12, the space correction group 1 which includes the lines 801, 802 and 803 is considered as the group α, and the group 2 which includes the lines 802, 803 and 805 is considered as the group β. In this case, only the line 801 (linewidth information number 1) is included in the group α and not included in the group β. Therefore, the processes subsequent to step S1402 are performed on the line 801. First, position relationship between the line 801 and the overlapping portion of the lines in the group β is checked. As apparent from FIG. 8, the line 801 is offset from none of the lines included in the group β. Accordingly, it is known that the group α and the group β can be combined.

Figure 16:
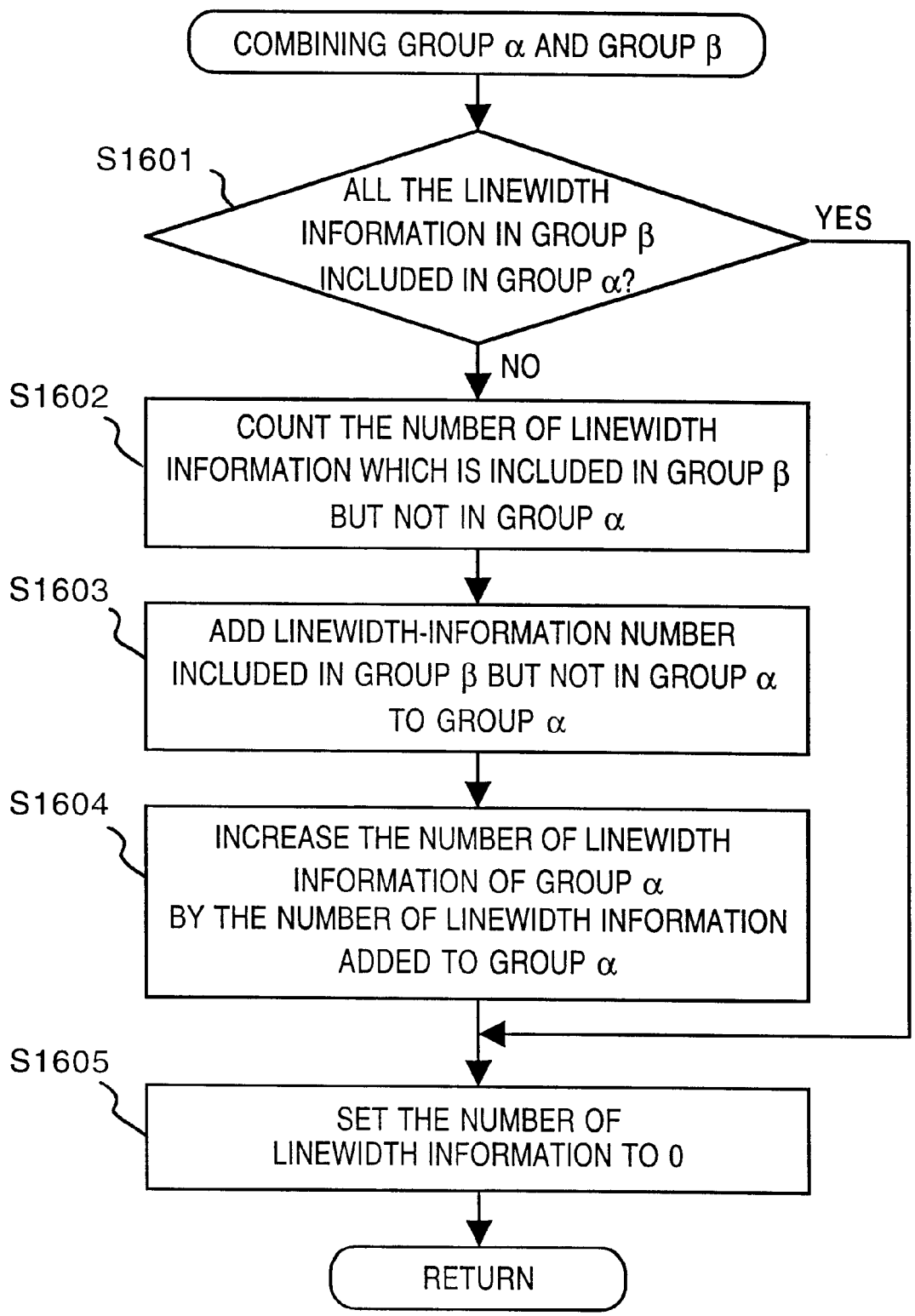
FIG. 16 is a flowchart showing a flow of processes according to the first embodiment.

A flowchart shown in FIG. 16 is for explaining a process of combining a space correction group referenced and a space correction group tested, which are determined to be able to be combined, into one.

At step S1601, whether all the linewidth information included in the group β is also included in the group α or not is determined. If it is, in other words, if the entire group β is included in the group α, the process moves to step S1605 where the group β is deleted. Whereas, if it is not, the process proceeds to step S1602.

At step S1602, the number of linewidth information in the group β which is not included in the group α is counted.

At step S1603, the linewidth information in the group β which is not included in the group α is added to the group α.

At step S1604, the number of the linewidth information of the group α is increased by the number of the linewidth information in the group β which is not included in the group α.

At step S1605, since the linewidth information in the group β is added to the group α, the group β becomes unnecessary. Accordingly, the number of the linewidth information of the group β is set to 0. By setting the number of the linewidth information to 0, the group β in the array C is determined invalid.

The above processes are performed on the vertical lines, too, and the space correction areas are determined. The space correction areas are represented by groups whose number of linewidth information included in the groups are not 0.

In an example shown in FIGS. 8 and 12, since it is known that the space correction group 1 and the space correction group 2 can be combined, thus the process shown in FIG. 16 is performed. Since only the line 805 included in the space correction group 2 to be tested is not included in the space correction group 1 to be referred, the number counted at step S1602 is 1. Further, at step S1603, the line 805 (linewidth information number is 5) is added as an element of the space correction group 1 of the array C. Thereafter, at step S1604, the number of linewidth information of the group 1 is incremented by 1. Note, if the group α to be referred and group β to be tested are switched, the same result can be obtained, although the different group number remains, since the remaining group becomes the group to be tested in the process shown in FIG. 16 in such a case. The condition in which the group β includes the linewidth information of the larger linewidth information number than that of the group α is set for avoiding duplication of the processes. Therefore, this condition can be also inverted. In that case, the space correction group 1 becomes a group to be tested, and combined into the space correction group 2 which is a group to be referred.

The aforesaid processes are applied to every space correction group. A space correction group whose number of linewidth information becomes 0 as a result of combining processes is the deleted one. Accordingly, once a group becomes invalid, it is not subjected to any comparison processes thereafter. An example of the result of combining groups under the condition in which the group β is combined into the group α ((α>β)) is shown as a table 1800 in FIG. 18. In the table 1800, the priority order of the space correction groups determined in the processes which are explained later is also shown. As a result, the character "盟" is divided into two groups; one includes the lines 801, 802, 803, 805 and 807, and the other includes the lines 804, 806 and 808.

Figure 17:
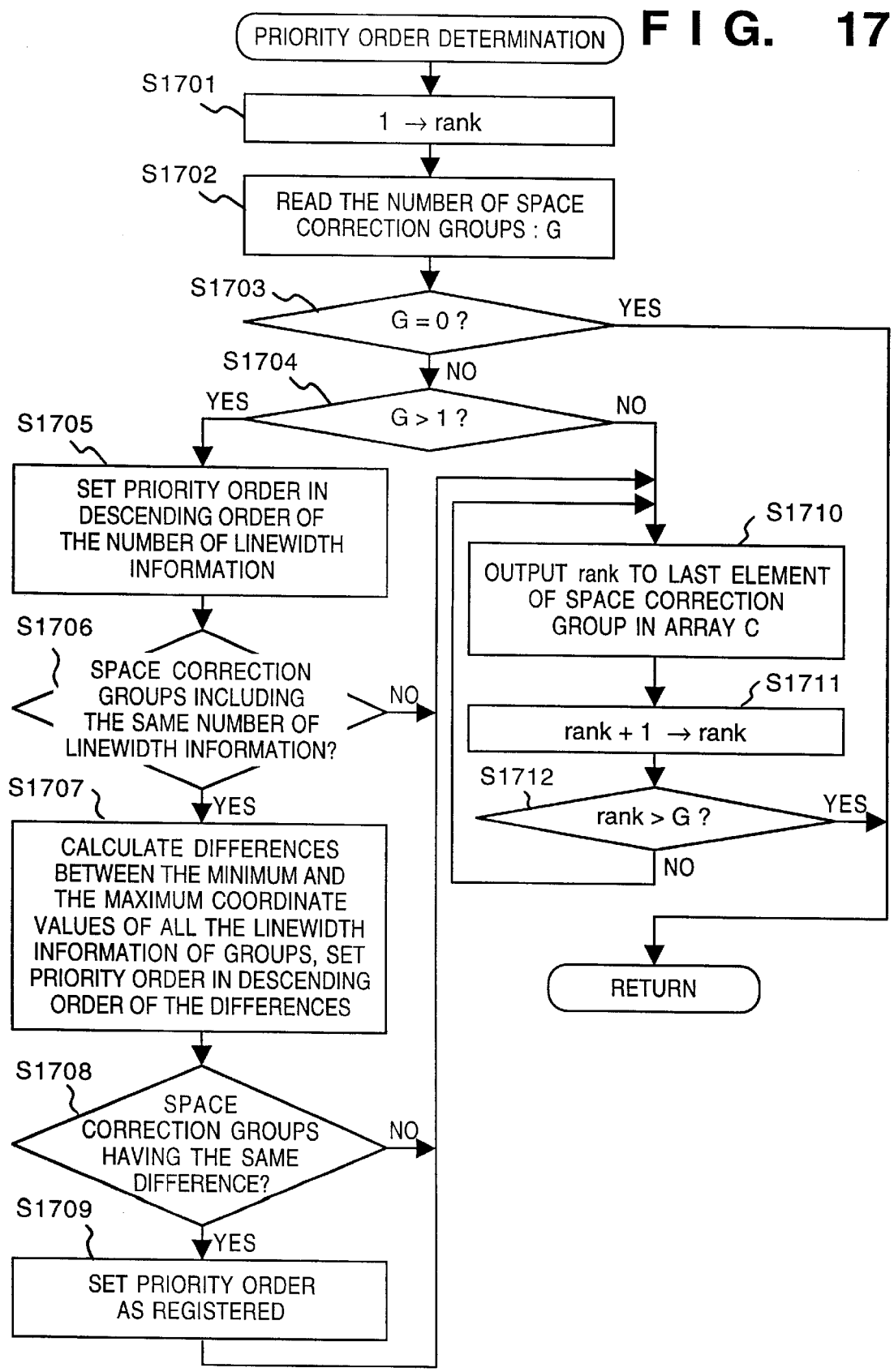
FIG. 17 is a flowchart showing processes for determining a priority order of space correction groups according to the first embodiment.

A flowchart shown in FIG. 17 is for explaining processing for determining the priority order between space correction groups.

At step S1701, a variable "rank", showing a priority order to be determined, is initialized to 1.

Next at step S1702, the number of the space correction groups is read from the array C. The read number is referred by G.

Then, at step S1703, if G is 0, then the process is completed by not performing space correction, and, if G is not 0, the process proceeds to step S1704.

At step S1704, if G is 1, the priority order is already set and the process moves to step S1710, and if G is not 1, then the process proceeds to step S1705.

At step S1705, the number of linewidth information composing each group is checked, and the priority order is set in the descending order of the number of the linewidth information.

At step S1706, whether there are a plurality of space correction groups including the same number of linewidth information or not is determined. If there are, the process proceeds to step S1707, whereas, if there are not, since the priority order is already set, and the process proceeds to step S1710.

At step S1707, the differences between the minimum and maximum coordinate values among the coordinate values of all the linewidth information of the groups are calculated, and the priority order is set in the descending order of the differences.

At step S1708, whether there are a plurality of groups having the same difference between the minimum and maximum coordinate values or not is determined. If there are, the process proceeds to step S1709, whereas, if there are not, the priority order is already set, and the process moves to step S1710.

At step S1709, the priority order is set to the groups having the same difference in the order as the groups are registered in the array C.

At the steps S1710 to S1712, the priority order is outputted as the last element of the array C in order to show the priority order determined in the processes at steps S1705 to S1709.

As described above, when there are a plurality of space correction groups, the priority order is basically determined in the descending order of the number of linewidth information included in the groups. Further, in a case where there are a plurality of groups having the same number of linewidth information, the priority order is determined based on the rules set in steps S1707 to S1709.

The array C for the character "翌" is as shown in the table 1800 in FIG. 18. The number of the space correction groups is 2, and the linewidth information numbers which belong to each group is stored in the second and later elements. FIG. 18 shows that the two space correction groups connected by the vertical lines 1802 and 1803 are determined. Further, the determined priority order is outputted as the last elements 1801. With the aforesaid processes, area or areas where spaces have to be corrected are determined on the basis of the shape of a character, thereby it is possible to add information to increase the quality of a character by determining the priority order in a case where there are a plurality of space correction groups.

The space correction groups obtained as described above show groups of lines, spaces of which are narrow and tend to be filled in color, which often causes deterioration of a character.

<Correction on a Character by Font Scaler>

As described above, space correction areas can be specified from linewidth information. A font scaler which received the information on the space correction areas and the linewidth information not only corrects areas, to be filled, of a generated character on the basis of the linewidth information but also corrects spaces between lines of the character on the basis of the obtained space correction information.

According to the apparatus described in the first embodiment, it is possible to specify areas in which spaces between lines are to be corrected as space correction groups on the basis of character data of outline form including linewidth correction information for correcting linewidth to be filled. By correcting linewidths on the basis of the linewidth information as well as portions which cause deterioration of the shape of a character, such as filled spaces between the lines and unevenness of the widths of spaces, which are supposed to be uniform, between the lines, it is possible to generate a character of good quality.

Further, since the priority order of the space correction groups is set on the basis of the number of lines included in each group, by performing space correction from an area of higher priority, which is more characteristic to a character, to an area of lower priority, it is possible to increase the quality of the character. Further, it is also possible to omit performing space correction on areas of lower priority. Accordingly, it is possible to increase the quality of the image as well as simplify the processing sequence.

On the basis of the space correction areas obtained as above, it is possible to generate a character image. However, a method of converting the array C into a format shown in FIG. 19 will be explained below.

In FIG. 18, the space correction areas are represented by space correction groups whose numbers of linewidth information in the array C are not 0, and linewidth information numbers which are elements of each space correction group is shown.

A process to output the relationship between coordinates of lines included in a space correction area in a data format shown in FIG. 19 will be explained by using the array C outputted in the aforesaid processing sequence as well as the lowest number LO and the highest number HI shown in FIG. 6. By making a table in the format shown in FIG. 19, the coordinates and the space correction areas are collected in a single table, thereby it becomes easier to perform consequent correction processes.

FIG. 19 is a table showing space correction information in the horizontal direction. Note, space correction information in the vertical direction is also outputted in the similar manner. Further, "hn" in FIG. 19 indicates the number of space correction groups in the horizontal direction.

Figure 20:
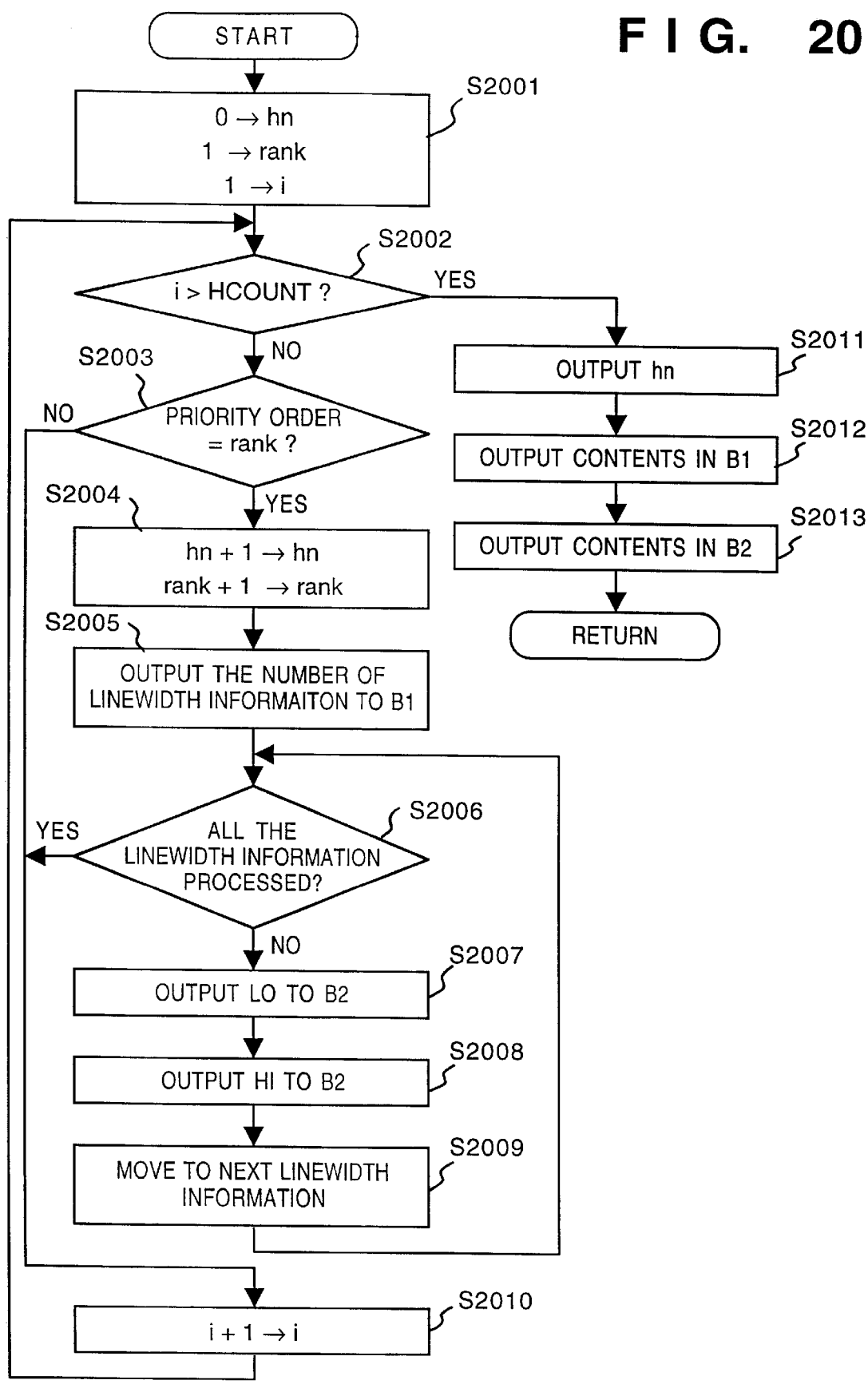
FIG. 20 is a flowchart showing a flow of processes according to the first embodiment.

FIG. 20 is a flowchart showing processing for outputting the array C, outputted by the aforesaid apparatus in the aforesaid processing sequence, as well as the lowest coordinate value LO and the highest coordinate value HI in a data format showing relationship between coordinates of lines in a space correction area as shown in FIG. 19.

At step S2001, the number of group hn is initialized to 0, and the variable "rank" showing the priority order is initialized to 1, and the counter i is initialized to 1.

At step S2002, whether all the groups registered in the array C have been processed or not is determined. If they have, the process moves to step S2011, whereas if they have not, the process proceeds to step S2003.

At step S2003, the number of linewidth information included in each group is sequentially read, and whether the priority order stored in the last element of the array C is equal to the variable "rank" or not is determined. If it is, the process proceeds to step S2004, whereas if it not, the process goes to step S2010.

At step S2004, since a space correction group having the priority order which is equal to the variable "rank" is detected, the number of hn is incremented by 1. Further, in order to process the space correction group having the next priority, the variable "rank" is also incremented by 1.

At step S2005, the number of the linewidth information in the space correction group detected at step S2003 is further outputted to a buffer B1 for temporary storage.

At steps S2006 to S2009, the lowest and the highest coordinate values are read from the linewidth information in the space correction group detected at step S2003 and outputted. Note, the contents written to the buffer B1 at steps S2005, S2007 and S2008 are kept until all the processes are completed on all the groups.

At step S2006, whether all the processes are completed on all the linewidth information of the space correction group is determined. If they are, the process goes to step S2010, whereas if they are not, the process proceeds to step S2007.

At step S2007, a linewidth information number is read from the array C, and the lowest coordinate value LO corresponding to the read linewidth information number is read from the linewidth information table shown in FIG. 6, then stored in a buffer B2 for temporary storage.

At step S2008, the linewidth information number is read from the array C, the corresponding highest coordinate value HI is read from the linewidth information table shown in FIG. 6, then additionally outputted to the buffer B2 for temporary storage. At step S2009, the linewidth information to be processed is moved to the next one in the same group.

If all the linewidth information in the group has been processed, the group to be processed is moved to the next one at step S2010.

If all the groups in the array C have been processed, the number of the valid space correction groups, hn, is outputted to a cell 1901 of the table shown in FIG. 19 at step S2011.

At step S2012, the contents of the buffer B1 are outputted to cells 1902 of the table shown in FIG. 19.

At step S2013, the contents of the buffer B2 are outputted to cells 1903 of the table shown in FIG. 19.

By performing the above processes, coordinate value information can be added to the array C which is outputted in the first embodiment. Accordingly, space correction areas can be specified as space correction groups as well as specifically shown as coordinate value information. Consequently, it becomes possible to output a character of good quality by performing space correction on the basis of the coordinate values.

Figure 26:
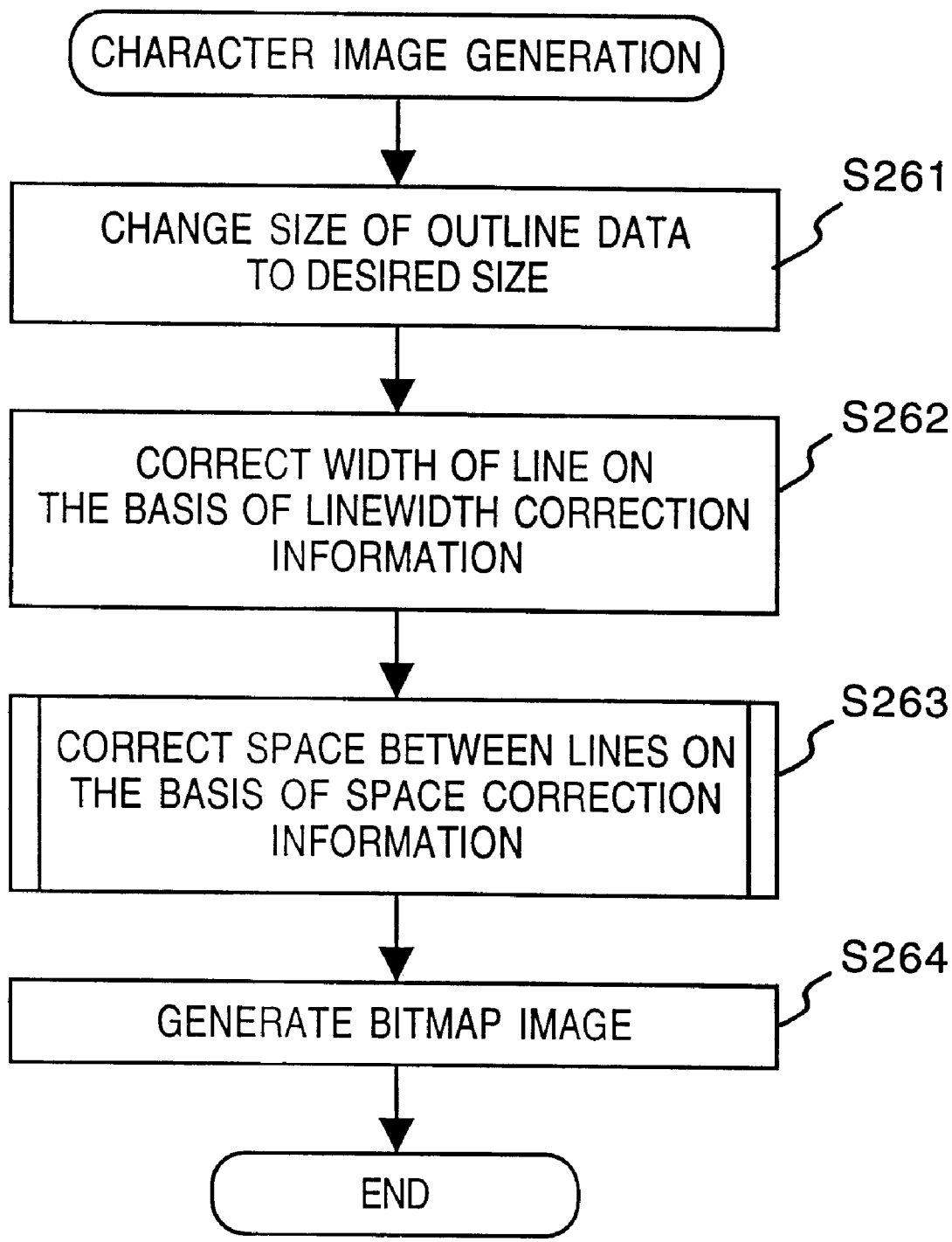
FIG. 26 is a flowchart showing a sequence of generating an image of a character.
Figure 27:
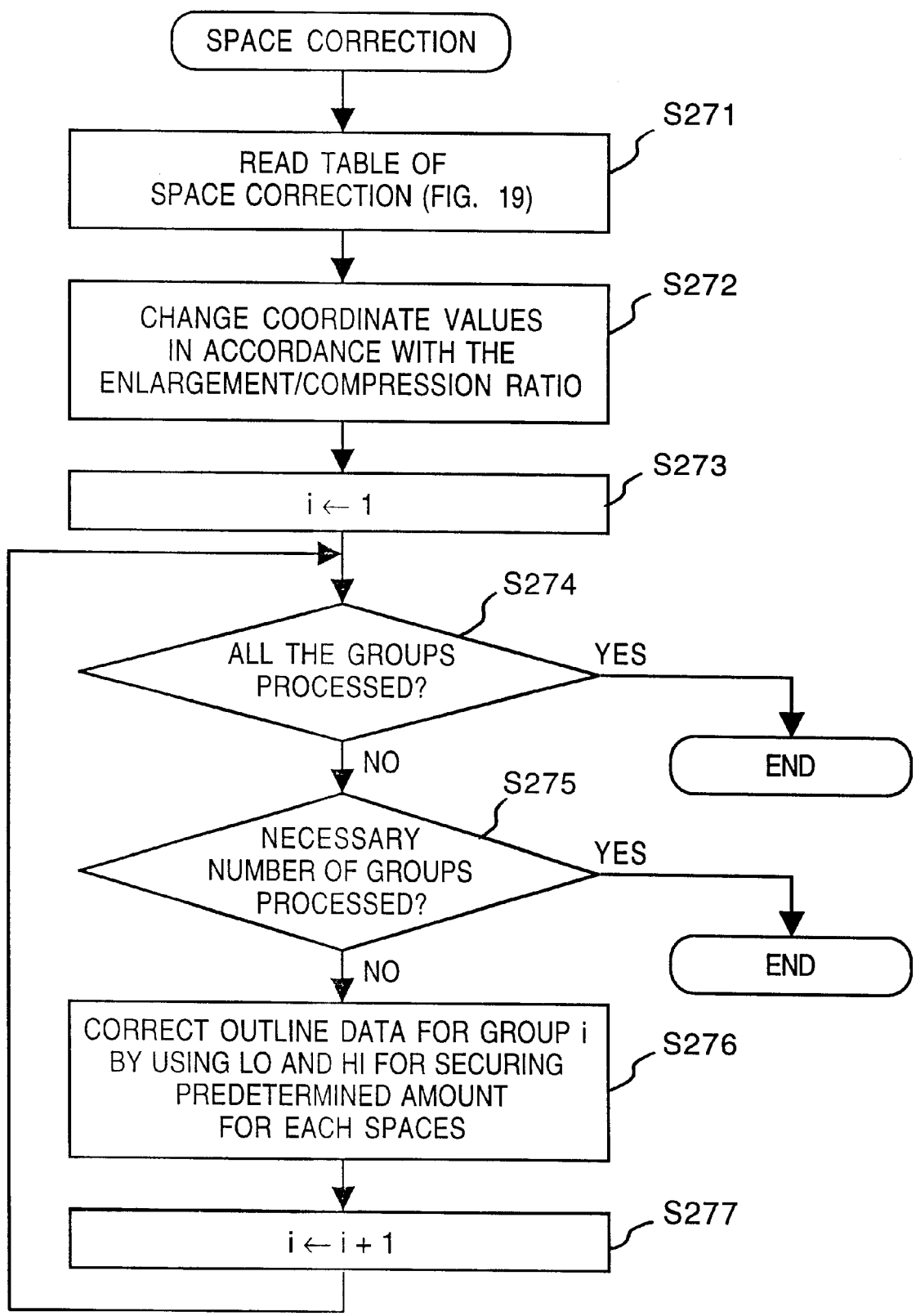
FIG. 27 is a flowchart showing a sequence of correcting a space between lines.

FIGS. 26 and 27 are flowcharts showing a sequence of generating a character image on the basis of outline data of a character by using the table of space correction groups shown in FIG. 19.

Referring to FIG. 26, at step S261, the size of outline data is changed to a desired size. Next at step S262, by using linewidth correction information which originally belongs to the outline data, the width of each line is corrected. At step S263, each space between the lines is corrected by using the space correction information, and at step S264, a bitmap image is generated from the corrected outline data.

FIG. 27 shows details of step S263 in FIG. 26.

First, at step S271, the table of the space correction groups shown in FIG. 19 is read. Next at step S272, coordinate values are changed in accordance with the enlargement/compression ratio used at step S261. The variable "i" showing the space correction group number is initialized to 1 (step S273). Thereafter, the step S273 is repeated until all the groups are processed or the necessary number of groups are processed. The necessary number of groups differ depending upon the enlargement/compression ratio and the desired quality of a character, for instance. If the size of the character to be outputted is small, for example, it is meaningless to perform corrections on many groups, and if the expected quality of a character to be outputted is in a level in which the character can be recognized, it is enough to perform groups which is labeled by high priority order.

At step S276, outline data is corrected so that a predetermined amount is secured for each space between lines by using the lowest coordinate values and highest coordinate values for the group i.

As described above, it is possible to correct a character image and output a character of high quality.

<Second Embodiment>

In the second embodiment, an example for applying the present invention to a standard prescribed by JIS X4163 original plan (this standard is called "X4163", hereinafter), "Griff Shape Expression Part III" in the "Material for Explanatory Meeting on JIS Standard of Document and Related Matters/Technical Seminar by Committee for Making an Original Plan of Document Description and Font of Japan Industrial Standard" published by Japan Business Machine Makers Associated on Mar. 10, 1994.

FIG. 21 shows examples of character rendering commands in X4163. In each command, operands are described in front of an operator. In the second embodiment, a command for designating to perform space correction is defined by "SPACE", and operands corresponding to this operator is defined as follow.

hnΔHG1ΔHG2Δ . . . HGnΔvnΔVG1ΔVG2 . . . ΔVGnΔNΔSPACE
(here, Δ shows a space).

hn indicates the number of space correction groups in the horizontal direction, and HGi (i=1 to n) indicates each space correction group in the horizontal direction. Further, vn indicates the number of space correction groups in the vertical direction, and VGi (i=1 to n) indicates each space correction group in the vertical direction. N is the number of the operands for the command SPACE.

Figure 22:
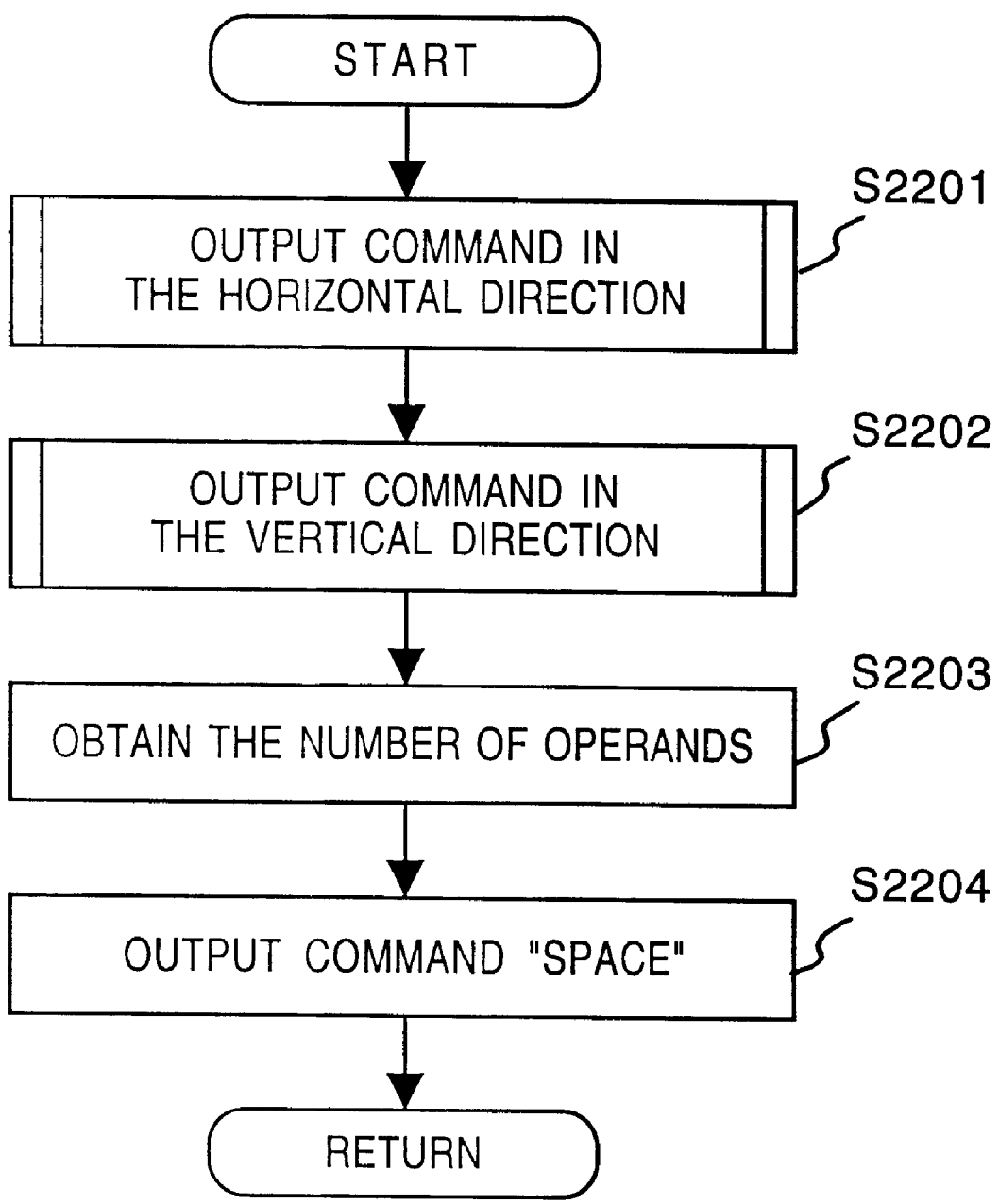
FIG. 22 is a flowchart showing a flow of processes according to the second embodiment.
Figure 23:
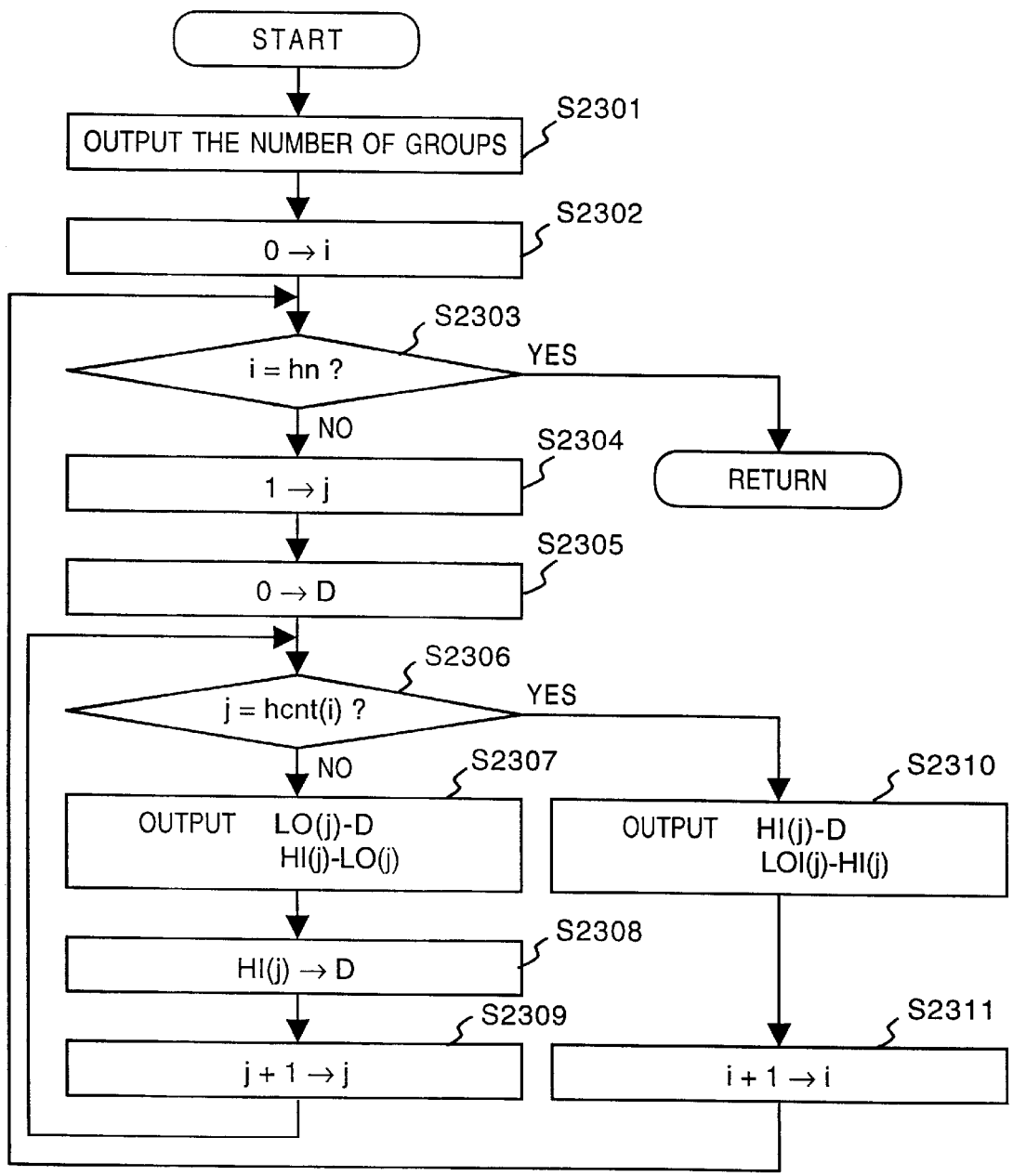
FIG. 23 is a flowchart showing a flow of processes according to the second embodiment.

Processes for making the command SPACE from the array shown in FIG. 19 are explained with reference to flowcharts shown in FIGS. 22 and 23. Here, as a rule for the command SPACE, each group is expressed by the following description.

LO(1)ΔHI(1)–LO(1)ΔLO(2)–HI(1)ΔHI(2)–LO(2)Δ . . . ΔHI(cnt)–HI(cnt–1)ΔLO(cnt)–HI(cnt).

LO(cnt) represents the lowest coordinate value of the linewidth information number, cnt, and HI(cnt) is the highest coordinate value of the linewidth information number, cnt. Linewidth information, registered in the table in FIG. 19, of each group is represented by the difference between coordinate values of a line and the previous line sequentially from the lowest value LO. cnt is the number of linewidth information in the same direction in the group. Further, as for the last linewidth information of each group, the lowest coordinate value LO and the highest coordinate value are switched. This is a rule for separating between a space correction group HG and a space correction group VG.

First, at step S2201, operands of the space correction information in the horizontal direction are outputted. This process will be explained with reference to a flowchart shown in FIG. 23.

At step S2202, operands of the space correction information in the vertical direction are outputted. This process is substantially the same as the process for the horizontal direction, thus the explanation of the process is omitted.

At step S2203, the number of operands obtained at steps S2201 and 2202 are counted. For each direction, the number of linewidth information included in each group is first doubled. This is because each linewidth information have two information, namely, the upper limit and the lower limit. Then, by adding 1 for securing a cell for the number of operands showing the number of the space correction groups to the product, the number of the operands of the command SPACE is obtained. The sums in the horizontal direction and in the vertical direction are added.

Then, at step S2204, the command "SPACE" is outputted.

Next, processes for outputting operands of the command "SPACE" on the basis of the array shown in FIG. 19, storing space correction information in the horizontal direction, are explained with reference to a flowchart shown in FIG. 23.

At step S2301, the number of space correction groups is outputted.

At step S2302, a counter for counting the number of space correction groups is initialized to 0.

At step S2303, whether operands of all the groups have been outputted or not is determined. If they have, the process is completed, whereas if they have not, the process proceeds to step S2304.

At step S2304, a counter j for counting the number of linewidth information in the i-th group is initialized to 1.

At step S2305, a variable "D" for outputting a difference is initialized to 0.

At step S2306, whether the linewidth information under processing is the last one or not is determined, and if it is, the process goes to step S2310, whereas if it is not, the process proceeds to step S2307.

At step S2307, LO(j)−D and HI(j)−LO(j) are outputted.

At step S2308, HI(j) is substituted by D for calculating the next difference.

At step S2309, the counter j for moving the linewidth information to be processed to the next linewidth information is incremented by 1.

If the linewidth information under processing is the last one, the HI(j)−D and LO(j)−HI(j) are outputted at step S2310.

At step S2311, the counter i is incremented by 1 for moving the space correction group to be processed to the next space correction group.

With the aforesaid processes in the second embodiment, space correction areas obtained in the processing sequence in the first embodiment can be expressed in a format commonly represented by X4163. Accordingly, by outputting space correction information in a predetermined command form to a font scaler having a space correction function, it is possible to output a character of high quality.

In a font scaler, with a sequence of processing the command "SPACE" in the aforesaid manner, it is possible to generate a character image of high quality by applying space correction on the basis of outline font data which holds linewidth information only.

Further, it is also possible to select whether space correction areas are to be inputted in a form of the table as described in the first embodiment or in a command form as described in the second embodiment on the basis of a flag set by a font scaler, for example. In this case, after a table in the form shown in FIG. 19 is generated, the flag is tested, first, then in a case of outputting in the command form, a command form is made as described in the second embodiment and outputted, otherwise, space correction areas are outputted in the form of the table shown in FIG. 19. In a font scaler, in response to reception of the space correction information, space correction is performed by using the information in the output form.

Note, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, a storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments. Briefly, the storage medium stores each module shown as an example of a memory map in FIG. 28. More specifically, program codes which correspond to an outline coordinates read module, a linewidth correction information read module, a space correction area determination module, a space correction area output module, a first correction module for correcting outline on the basis of linewidth correction information and a second correction module for correcting outline on the basis of linewidth information, at least, are to be stored in the storage medium.

Figure 28:
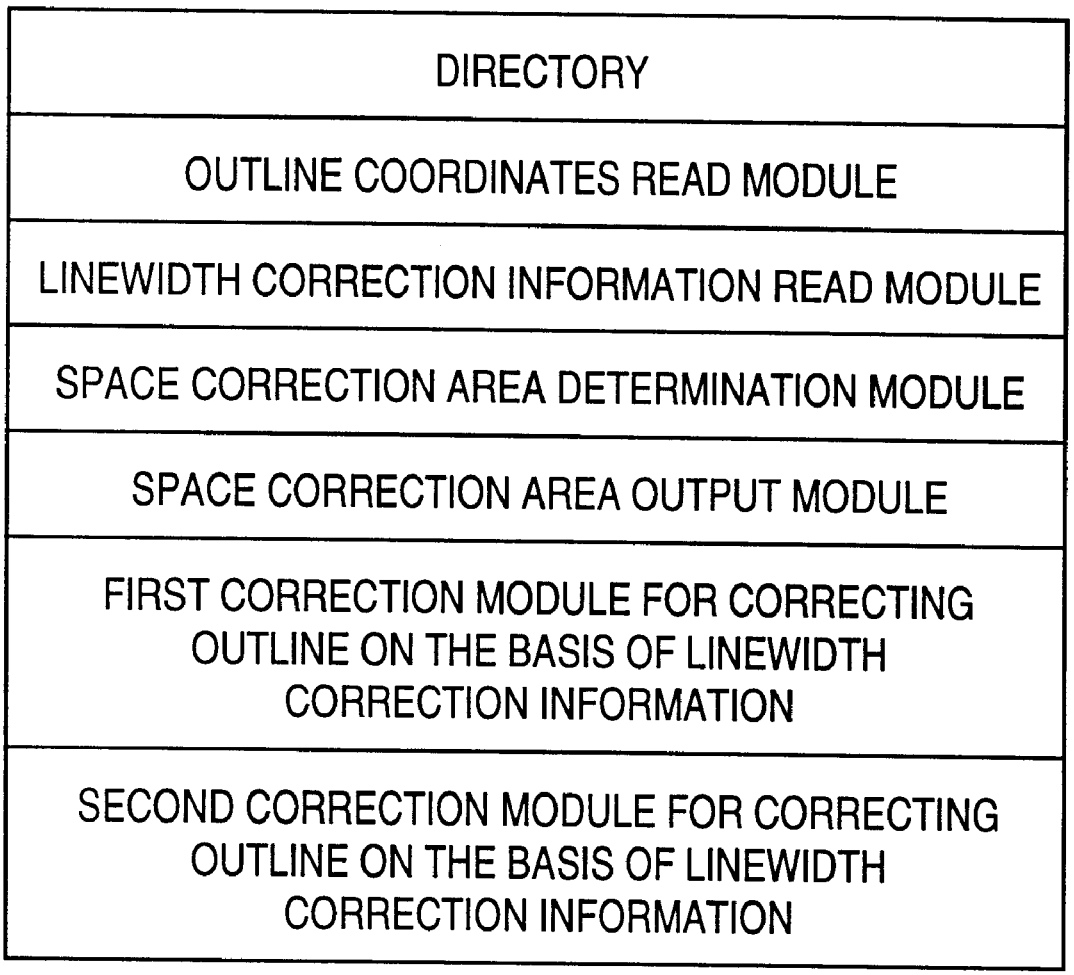
FIG. 28 is an explanatory view showing structure of a program capable of realizing the same operation as that of the apparatus of the present invention.
Figure 29A:
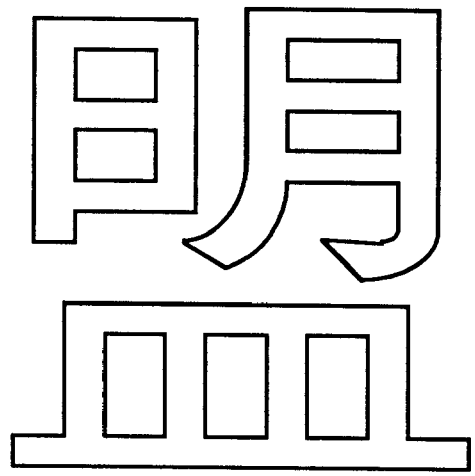
FIGS. 29A and 29B are explanatory views showing an example of a character whose spaces are not properly expressed.
Figure 29B:
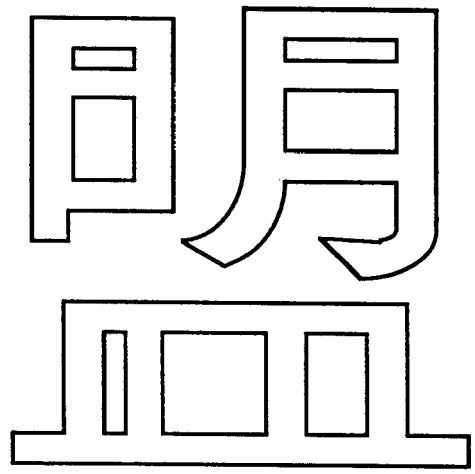

For example, it is possible to achieve the same advantages as described in the first and second embodiments by storing a program having structure as shown in FIG. 28 in a storage medium, such as a floppy disk 1011 shown in FIG. 1, reading the program into the RAM 103, and executing the program by the CPU 101.

The present invention can be applied to a system constituted by a plurality of devices (e.g., host computer, interface, reader, printer) or to an apparatus comprising a single device (e.g., copying machine, facsimile).

According to the character data processing apparatus and method as described above, it is possible to obtain space correction areas, which are subject to correction, between lines on the basis of linewidth correction information of outline data. Further, it is possible to generate a character image of high resolution by applying space correction.

The present invention is not limited to the above embodiments and various changes and modifications can be made within the spirit and scope of the present invention. Therefore to appraise the public of the scope of the present invention, the following claims are made.

What is claimed is:

1. A font generating apparatus comprising:
    determining means for determining, for horizontal and vertical lines of a character, a group of parallel lines of the character composed of a plurality of lines such that a line belonging to the group of parallel lines is not offset from any other line belonging to the group of parallel lines in the longitudinal direction, based on original font data; and
    generating means for generating font data, wherein a space between lines included in the group of parallel lines, determined by said determining means, is corrected based on the original font data.

2. The apparatus according to claim 1, wherein said determining means determines, for the horizontal and vertical lines, the group of parallel lines further satisfying a condition that a distance between a line and a specific line both belonging to the group of parallel lines is less than or equal to a predetermined value.

3. The apparatus according to claim 1, further comprising reconstruction means for reconstructing the group of parallel lines by combining a plurality of groups of parallel lines which satisfy a predetermined condition.

4. The apparatus according to claim 1, further comprising priority deciding means for deciding a priority of the group of parallel lines such that a higher priority is given to a group of parallel lines including a larger number of lines than a group of parallel lines including a relatively smaller number of lines in a case where a plurality of groups are determined by said determining means.

5. An output apparatus comprising:
   storage means for storing font data generated by a font generation apparatus; and
   output means for outputting a character based on the font data stored by said storage means,
   wherein the font generation apparatus includes determining means for determining a group of parallel lines of a character composed of a plurality of lines such that, for horizontal and vertical lines of the character, a line belonging to the group of parallel lines is not offset from any other line belonging to the group of parallel lines in a longitudinal direction, based on original font data, and generating means for generating font data, wherein a space between lines included in the group of parallel lines determined by the determining means is corrected based on the original font data.

6. The apparatus according to claim 5, wherein said output means is a printer.

7. The apparatus according to claim 5, wherein said output means is a display.

8. A data generating method comprising the steps of:
   determining, for horizontal and vertical lines of a character, a group of parallel lines of the character composed of a plurality of lines such that a line belonging to the group of parallel lines is not offset from any other line belonging to the group of parallel lines in a longitudinal direction, based on original font data; and
   generating font data, wherein a space between lines included in the group of parallel lines, determined in said determining step, is corrected based on the original font data.

9. The method according to claim 8, wherein said determining step determines, for the horizontal and vertical lines, the group of parallel lines further satisfying a condition that a distance between a line and a specific line both belonging to the group of parallel lines is less than or equal to a predetermined value.

10. The method according to claim 8, further comprising a reconstruction step of reconstructing the group of parallel lines by combining a plurality of groups of parallel lines which satisfy a predetermined condition.

11. The method according to claim 8, further comprising a priority deciding step of deciding a priority of the group of parallel lines such that a higher priority is given to a group of parallel lines including a larger number of lines than a group of parallel lines including a relatively smaller number of lines in a case where a plurality of groups are determined in said determining step.

12. An output method comprising the steps of:
    storing font data generated by a font generation apparatus; and
    outputting a character based on the font data stored in said storing step,
    wherein the font generation apparatus performs a determining step for determining a group of parallel lines of a character composed of a plurality of lines such that, for horizontal and vertical lines of the character, a line belonging to the group of parallel lines is not offset from any other line belonging to the group of parallel lines in a longitudinal direction, based on original font data, and a generating step for generating font data, wherein a space between lines included in the group of parallel lines determined in the determining step is corrected based on the original font data.

13. The method according to claim 12, wherein said outputting step outputs to a printer.

14. The method according to claim 12, wherein said outputting step outputs to a display.

15. A computer readable memory holding a computer program, said program comprising:
    code for determining, for horizontal and vertical lines of a character, a group of parallel lines of the character composed of a plurality of lines such that a line belonging to the group of parallel lines is not offset from any other line belonging to the group of parallel lines in a longitudinal direction, based on original font data; and
    code for generating font data, wherein a space between lines included in the group of parallel lines, determined using said code for determining, is corrected based on the original font data.

16. A memory according to claim 15, wherein said code for determining determines, for the horizontal and vertical lines, the group of parallel lines further satisfying a condition that a distance between a line and a specific line both belonging to the group of parallel lines is less than or equal to a predetermined value.

17. A memory according to claim 15, further comprising code for reconstructing the group of parallel lines by combining a plurality of groups of parallel lines which satisfy a predetermined condition.

18. A memory according to claim 15, further comprising code for deciding a priority of the group of parallel lines such that a higher priority is given to a group of parallel lines including a larger number of lines than a group of parallel lines including a relatively smaller number of lines in a case where a plurality of groups are determined using said code for determining.

19. A computer readable memory holding a computer program, said computer program comprising:
    code for storing font data generated by a font generation apparatus; and
    code for outputting a character based on the font data stored using said code for storing,
    wherein the font generation apparatus determines a group of parallel lines of a character composed of a plurality of lines such that, for horizontal and vertical lines of the character, a line belonging to the group of parallel lines is not offset from any other line belonging to the group of parallel lines in a longitudinal direction, based on original font data, and generates font data, wherein a space between lines included in the group of parallel lines determined by the font generation apparatus is corrected based on the original font data.

20. A memory according to claim 19, wherein said code for outputting outputs to a printer.

21. A memory according to claim 19, wherein said code for outputting outputs to a display.

* * * * *

UNITED STATES PATENT AND TRADEMARK OFFICE
CERTIFICATE OF CORRECTION

PATENT NO.     : 6,026,185
DATED          : February 15, 2000
INVENTOR(S)    : Yasuhiro Kujirai It is certified that error appears in the above-identified patent and that said Letters Patent is hereby corrected as shown below:

Column 7:
Line 12, "are" should read --is--;
Line 42, "satisfy" should read --satisfies--; and
Line 48, "by" should read --to by--.

Column 8:
Line 34, "less" should read --less than--.

Column 9:
Line 2, "the each" should read --each--;
Line 8, "follow" should read --follows.--; and
Line 67, " (is" should read --is--.

Column 10:
Line 23, "group" should read --groups--; and
Line 42, "comparison" should read --comparisons--

Column 11:
Line 8, "1502, hatched by net," should read
--1502 (crosshatched), --.

Column 13:
Line 5, "and" should be deleted.

Column 14:
Line 54, "it" should read --it is--.

UNITED STATES PATENT AND TRADEMARK OFFICE
CERTIFICATE OF CORRECTION

PATENT NO.    : 6,026,185
DATED         : February 15, 2000
INVENTOR(S)   : Yasuhiro Kujirai It is certified that error appears in the above-identified patent and that said Letters Patent is hereby corrected as shown below:

Column 15:
Line 64, "perform groups which is" should read --perform corrections on groups which are--.

Column 16:
Line 19, "is" should read --are--; and
Line 38, "ALO" should read --$\Delta$LO--.

Column 18:
Line 4, "are" should be deleted; and
Line 47, "appraise" should read --apprise--.

Signed and Sealed this

Twelfth Day of June, 2001

*Attest:*

*Attesting Officer*

NICHOLAS P. GODICI
*Acting Director of the United States Patent and Trademark Office*